(12) United States Patent
Watanabe et al.

(10) Patent No.: US 8,503,325 B2
(45) Date of Patent: Aug. 6, 2013

(54) PACKET TRANSFER DEVICE AND PACKET TRANSFER METHOD

(75) Inventors: Kazuhiro Watanabe, Yokohama (JP);
Yoshihiro Ashi, Yokohama (JP);
Takayuki Kanno, Yokohama (JP);
Masayuki Takase, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 73 days.

(21) Appl. No.: 13/301,878

(22) Filed: Nov. 22, 2011

(65) Prior Publication Data

US 2012/0127877 A1 May 24, 2012

(30) Foreign Application Priority Data

Nov. 24, 2010 (JP) ................................ 2010-261669

(51) Int. Cl.
*H04L 12/26* (2006.01)

(52) U.S. Cl.
USPC ........... 370/252; 370/401; 370/235; 370/389; 370/412; 370/394

(58) Field of Classification Search
USPC ................. 370/252, 401, 235, 236, 414, 389, 370/238, 412, 419, 394
See application file for complete search history.

(56) References Cited

U.S. PATENT DOCUMENTS

| | | | | |
|---|---|---|---|---|
| 6,831,922 | B1* | 12/2004 | Shimada | 370/403 |
| 7,757,028 | B2* | 7/2010 | Druke et al. | 710/244 |
| 7,869,428 | B2 | 1/2011 | Shake et al. | |
| 7,974,256 | B2* | 7/2011 | Sugaya et al. | 370/343 |
| 8,122,169 | B2* | 2/2012 | Kojima et al. | 710/52 |
| 8,208,483 | B2* | 6/2012 | Thyni | 370/417 |
| 2003/0219014 | A1* | 11/2003 | Kotabe et al. | 370/375 |
| 2006/0072576 | A1* | 4/2006 | Miao et al. | 370/394 |
| 2007/0011359 | A1* | 1/2007 | Chen et al. | 709/251 |
| 2011/0261814 | A1* | 10/2011 | Matthews et al. | 370/389 |

FOREIGN PATENT DOCUMENTS

| | | |
|---|---|---|
| JP | 4-243335 A | 8/1992 |
| JP | 2005-102157 A | 4/2005 |

* cited by examiner

*Primary Examiner* — Rasheed Gidado
(74) *Attorney, Agent, or Firm* — Mattingly & Malur, PC

(57) ABSTRACT

Packet transfer device and method have both a processing procedure for uninterruptible-switching desiring packets and a processing procedure for low-delay desiring packets, and process each user packet according to a desired one of the processing procedures. The uninterruptible-switching desiring packets are set to be in phase by a delay unit and written into an uninterruptible-switching memory. The low-delay desiring packets are written into a low-delay memory without passing trough the delay unit, that is, without being delayed. A read-out controller reads out a packet from the uninterruptible-switching memory. When the read-out packet is an uninterruptible-switching desiring packet, the packet is directly output, and when the read-out packet is a low-delay desiring packet, the packet is discarded, and a low-delay desiring packet is read out from the low-delay memory and output.

13 Claims, 20 Drawing Sheets

| PACKET TYPE | ADDED TAG VALUE |
|---|---|
| UNINTERRUPTIBLE-SWITCHING DESIRING PACKET | 1 |
| LOW-DELAY DESIRING PACKET | 2 |
| MARKER PACKET | 3 |

FIG.4

| PACKET TYPE | TRANSMISSION TO DELAY UNIT | TRANSMISSION TO LOW-DELAY MEMORY |
|---|---|---|
| UNINTERRUPTIBLE-SWITCHING DESIRING PACKET | YES | NO |
| LOW-DELAY DESIRING PACKET | YES | YES |
| MARKER PACKET | YES | NO |

FIG.6

| USER IDENTIFICATION INFORMATION | USER TYPE INFORMATION |
|---|---|
| USER A | UNINTERRUPTIBLE SWITCHING |
| USER B | LOW DELAY |
| ... | ... |

PACKET TRANSFER DEVICE AND PACKET TRANSFER METHOD

CLAIM OF PRIORITY

The present application claims priority from Japanese patent application JP 2010-261669 filed on Nov. 24, 2010, the content of which is hereby incorporated by reference into this application.

BACKGROUND OF THE INVENTION

1. Field of the Invention

The present invention relates to a packet transfer device and a packet transfer method, and particularly to a packet transfer device and a packet transfer method that transmit input packets by using a redundancy configuration of plural systems, and select and output packets for one transmission path at a reception side in a packet transfer network such as an IP network, or Ethernet (registered trademark).

2. Description of the Related Art

A network construction based on a redundancy configuration using an uninterruptible switching technique is known in a packet transfer network, particularly in a network demanding communications in which data are not missing. The following packet transfer method and device using Ethernet (registered trademark) are known in the above type of technique.

A packet transmitting function part of a packet transfer device at a transmission side creates two copies from each of received packets, adds each of these copied packets with a sequence number for identifying the same transmission order, further adds each of the copied packets with an identifier for identifying a transmission path, and then transmits these copied packets to different transfer paths, respectively. A packet receiving function part of a packet transfer device at a reception side receives the packets (the packets transferred from the transmission side) by two receiving units, and identifies packets having the same information and the transmission order thereof on the basis of the sequence numbers and the identifiers of the received packets. Furthermore, the packet receiving function part selects one of the packets having the same transmission order, transmits the selected packet to the downstream side and discards the other packet (non-selected packet). Or, when only one of the packets arrives at the reception side, the packet receiving function part transfers the arrival packet to the downstream side, thereby implementing an uninterruptible switching function (see JP-A-2005-102157 (hereinafter referred to as "patent document 1"), for example).

Furthermore, according to another uninterruptible switching technique, a packet transmitting function part of a packet transfer device at a transmission side creates two copies from each of received packets, adds each of the copied packets with a predetermined identification signal and then transmits the copied packets to different transmission paths. Furthermore, a packet receiving function part of a packet transfer device at a reception side receives the packets by two receiving units, and detects the difference in arrival time between the packets received by both the two receiving units on the basis of the identifiers of the packets. On the basis of the arrival time difference, the packet receiving function part applies a delay to each packet of an earlier arrival packet group (i.e., each of packets which are transmitted through one of the transmission paths and arrive at the reception side earlier than the corresponding packets transmitted through the other transmission path) to eliminate the time difference, whereby the uninterruptible switching function is implemented (see JP-A-4-243335 (hereinafter referred to as "patent document 2"), for example).

SUMMARY OF THE INVENTION

FIG. 18 is a time chart showing an operation of a related art 1.

The operation of the packet receiving function part in the technique described in the patent document 1 is shown in FIG. 18. When packets are transmitted through two systems (0-system and 1-system), it is generally considered that one of the two systems serves as an earlier arrival system and the other system serves as a later arrival system in accordance with the difference in transmission time. When a packet is missing in the earlier arrival system, a packet reception device waits for a packet having the same sequence number in the later arrival system, so that packets to be output from the packet reception device may be temporarily transmitted in a burst style.

When packets are transmitted in the burst style from the packet reception device to a user network like output packets of packet numbers 4 to 8 of FIG. 18, data may be missing due to buffer overflow at a terminal connected to the user network. When the terminal is an image reproducing device, a reproduced image may be disturbed. Furthermore, since the image reproducing device requires reception in a fixed band, buffer underflow may occur when the interval between packets to be output is large like output packets of packet numbers 3 and 4 of FIG. 18. Therefore, a reproduced image may be disturbed as in the case of the buffer overflow.

FIG. 19 is a time chart showing an operation of a related art 2.

According to the technique described in the patent document 2, in order to eliminate the difference in arrival time between two received packets, the packet receiving function part applies a fixed delay to packets of an earlier arrival system so that the packets of the earlier arrival system are in phase with packets of a later arrival system as shown in FIG. 19. Accordingly, even when a packet is missing in the earlier arrival system, a packet (corresponding to the missing packet concerned) can be transmitted from the later arrival system at the same time position. Therefore, the burst transmission of output packets described in the patent document 1 can be avoided. However, packets input to a packet transfer device undergo a route delay caused by the longest route between packet transfer devices irrespective of the transfer route through which the packets are transferred.

A case where "uninterruptible switching" and "low delay" have a so-called tradeoff relationship is considered. In this case, a user is allowed to determine which one of "uninterruptible switching" and "low delay" takes precedence.

Here, it is assumed that a user does not need the uninterruptible switching function, but desires to reduce the transfer delay amount of packets (low delay) and packets of the user are transferred. In this case, the packet transfer device having the uninterruptible switching function described in the patent document 2 has a problem that the transfer delay amount is larger as compared with a device which is provided no uninterruptible switching function and thus does not undergo any route delay caused by the uninterruptible switching function.

In order to solve this problem, a manager performs packet transfer for packets of a user desiring "uninterruptible switching" by using an uninterruptible switching device, and performs packet transfer for packets of a user desiring "low delay" by using a packet transfer device in which the fixed delay caused by the uninterruptible switching function does not occur. However, this solving method has a problem that the cost for the system operation increases because the manager operates two types of packet transfer networks (a packet transfer network for "uninterruptible switching" and a packet transfer network for "low delay") in parallel in order to satisfy requirements of two types of users who desire "uninterruptible switching" and "low delay", respectively.

An object of the present invention is to solve the forgoing problem of the related arts, and provide a packet transfer device and a packet transfer method that enable packets of a user desiring "uninterruptible switching" and packets of a user desiring "low delay" to be contained in mixture in the same device and can perform packet transfer with avoiding burst transmission of output packets for the packets of the user desiring "uninterruptible switching" and without generating any route delay caused by an uninterruptible switching function for the packets of the user desiring "low delay".

In order to attain the above object, the present invention can be implemented by a packet transfer method of providing both of a processing procedure for uninterruptible-switching desiring packets and a processing procedure for low-delay desiring packets in the same device, and processing each user packet through a desired one of the processing procedures.

Specifically, the present invention can be implemented by the following packet transfer method.

In a packet transmitting function part of a packet transfer device, it is identified whether a packet received from a transmission source user network is an uninterruptible-switching desiring packet or a low-delay desiring packet, a tag is added to the user packet on the basis of an identification result, a marker packet used to measure a path delay difference is inserted at any timing by a manager, copies of the user packet and the marker packet are generated and the copied packets are transmitted through plural communication paths.

In a packet receiving function part of a packet transfer device, packets are received from the plural communication paths, it is identified on the basis of tag information of each received packet which one of an uninterruptible-switching desiring packet, a low-delay desiring packet and a marker packet the received packet corresponds to, the packet is transmitted to the processing procedure for the uninterruptible-switching desiring packets when the received packet is an uninterruptible-switching desiring packet, the packet is transmitted to both the processing procedure for the uninterruptible-switching desiring packets and the processing procedure for the low-delay desiring packets when the received packet is a low-delay desiring packet, and the packet is transmitted to the processing procedure for the uninterruptible-switching desiring packets when the received packet is a marker packet.

In the processing procedure for the uninterruptible-switching desiring packets, packets of an earlier arrival system are delayed by a time difference between arrival of the packets of the earlier arrival system and packets of a latest arrival system on the basis of an arrival time difference of the marker packets so that the packets transmitted through all the paths are set to be in phase, and the packets are transmitted to a rear stage. In the processing procedure for the low-delay desiring packets, the packets are transmitted to the rear stage without being delayed, read-out of packets from the processing procedure for the uninterruptible-switching desiring packets and the processing procedure for the low-delay desiring packets is controlled to transmit the packets, and one system is selected from plural systems to transmit the packets to a transmission destination user network.

Furthermore, according to the present invention, a packet transfer device includes: a packet transmitting function part including a unit for identifying whether a packet received from a transmission source user network is an uninterruptible-switching desiring packet or a low-delay desiring packet, a unit for adding a tag to the user packet on the basis of an identification result, a unit for inserting a marker packet used to measure a path delay difference at any timing by a manager, a unit for multiplexing the user packet and the marker placket, a unit for copying the user packet and the marker packet into plural packets and a unit for transmitting the copied packets to plural communication paths; and a packet receiving function part including a unit for receiving packets from the plural communication paths, a unit for identifying on the basis of tag information of each received packet which one of an uninterruptible-switching desiring packet, a low-delay desiring packet and a marker packet the received packet corresponds to, transmitting the received packet to the processing procedure for the uninterruptible-switching desiring packets when the received packet is an uninterruptible-switching desiring packet, transmitting the received packet to both the processing procedure for the uninterruptible-switching desiring packets and the processing procedure for the low-delay desiring packets when the received packet is a low-delay desiring packet, and transmitting the packet to the processing procedure for the uninterruptible-switching desiring packets when the received packet is a marker packet, a unit for measuring an arrival time of the marker packets, a unit for measuring an arrival time difference of the marker packets, a unit for delaying packets of an earlier arrival system by a time difference between arrival of the packets of the earlier arrival system and packets of a latest arrival system on the basis of the arrival time difference of the marker packets so as to set the packets transmitted through all the paths to be in phase in the processing procedure for the uninterruptible-switching desiring packets, a unit for transmitting the packets to the rear stage without being delayed in the processing procedure for the low-delay desiring packets, a unit for controlling read-out of packets from the processing procedure for the uninterruptible-switching desiring packets and the processing procedure for the low-delay desiring packets, and a unit for selecting one system from plural systems to transmit the packets to a transmission destination user network.

According to the first solving means of the present invention, there is provided a packet transfer device that transmits input packets by using a redundancy configuration of plural systems, and selects and outputs packets for one transmission path at a reception side in a packet transfer network, comprising:

an uninterruptible-switching memory and a low-delay memory that store packets;

a delay unit that delays an input packet by a specified time and outputs a delayed packet to the uninterruptible-switching memory;

a packet type identifying unit that refers to a tag added to a received packet to identify which one of an uninterruptible-switching desiring packet, a low-delay desiring packet and a marker packet the received packet corresponds to, transmits received uninterruptible-switching desiring packets, low-delay desiring packets and marker packet to the delay unit, transmits only low-delay desiring packets to the low-delay memory, and extracts and outputs a reception time and identification information of a marker packet when the received packet corresponds to the marker packet;

a controller that measures a packet arrival time difference between a 0-system and a 1-system on the basis of the reception time and the identification information of the marker packet informed from the packet type identifying unit, instructs the packet arrival time difference to the delay unit to make uninterruptible-switching desiring packets of the 0-system and the 1-system be in phase with each other and transmits the uninterruptible-switching desiring packets from the delay unit to the uninterruptible-switching memory; and a read-out controller that reads out packets from the uninterruptible-switching memory and/or the low-delay memory and controls packets to be transmitted, wherein the read-out controller reads out a packet from the uninterruptible-switching memory, refers to a tag of the packet read out from the uninterruptible-switching memory to identify which one of an uninterruptible-switching desiring packet, a low-delay desiring packet and a marker packet the read-out packet corresponds to, and transmits the read-out packet when the read-out packet is an uninterruptible-switching desiring packet or a marker packet, and discards the packet read out from the uninterruptible-switching memory, when the read-out packet is a low-delay desiring packet, and further reads out and outputs a packet when the packet is stored in the low-delay memory.

According to the second solving means of the present invention, there is provided a packet transfer device that transmits input packets by using a redundancy configuration of plural systems, and selects and outputs packets for one transmission path at a reception side in a packet transfer network, comprising:

an uninterruptible-switching memory and a low-delay memory that store packets;

a delay unit that delays an input packet by a specified time and outputs the delayed packet to the uninterruptible-switching memory;

a packet type identifying unit that refers to a tag added to a received packet to identify which one of an uninterruptible-switching desiring packet, a low-delay desiring packet and a marker packet the received packet corresponds to, transmits received uninterruptible-switching desiring packets, low-delay desiring packets and marker packet to the delay unit, transmits only low-delay desiring packets to the low-delay memory, and extracts and outputs a reception time and identification information of a marker packet when the received packet corresponds to the marker packet;

a controller that measures a packet arrival time difference between a 0-system and a 1-system on the basis of the reception time and the identification information of the marker packet informed from the packet type identifying unit, instructs the packet arrival time difference to the delay unit to make uninterruptible-switching desiring packets of the 0-system and the 1-system be in phase with each other and transmits the uninterruptible-switching desiring packets from the delay unit to the uninterruptible-switching memory; and a read-out controller that reads out packets from the uninterruptible-switching memory and/or the low-delay memory and controls packets to be transmitted, wherein the read-out controller reads out a packet from the uninterruptible-switching memory, refers to a tag of the packet read out from the uninterruptible-switching memory to identify which one of an uninterruptible-switching desiring packet, a low-delay desiring packet and a marker packet the read-out packet corresponds to, and transmits the read-out packet when the read-out packet is an uninterruptible-switching desiring packet or a marker packet, discards the packet read out from the uninterruptible-switching memory, when the read-out packet is a low-delay desiring packet, and further reads out and outputs a packet when the packet is stored in the low-delay memory, and wherein the read-out controller obtains an empty time length preceding to incoming of a next uninterruptible-switching desired packet or a marker packet in the uninterruptible-switching memory, compares the obtained empty time length and a packet length of a packet which has been read out from the low-delay memory and held in the read-out controller without being transmitted or a packet length of the packet read out from the low-delay memory when no packet is held in the read-out controller, and transmits the packet when the packet length of the packet is shorter than or equal to the empty time length or holds the packet when the packet length is conversely longer than the empty time length.

According to the third solving means of the present invention, there is provided a packed transfer method in a packet transfer device that transmits input packets by using a redundancy configuration of plural systems, and selects and outputs packets for one transmission path at a reception side in a packet transfer network, comprising steps of:

delaying an input packet by a specified time and outputting a delayed packet to an uninterruptible-switching memory, by a delay unit;

referring to a tag added to a received packet to identify which one of an uninterruptible-switching desiring packet, a low-delay desiring packet and a marker packet the received packet corresponds to, transmitting received uninterruptible-switching desiring packets, low-delay desiring packets and marker packet to the delay unit, transmitting only low-delay desiring packets to a low-delay memory, and extracting and outputting a reception time and identification information of a marker packet when the received packet corresponds to the marker packet;

measuring a packet arrival time difference between a 0-system and a 1-system on the basis of the reception time and the identification information of the marker packet, instructing the packet arrival time difference to the delay unit to make uninterruptible-switching desiring packets of the 0-system and the 1-system be in phase with each other and transmitting the uninterruptible-switching desiring packets from the delay unit to the uninterruptible-switching memory;

reading out a packet from the uninterruptible-switching memory, referring to a tag of the packet read out from the uninterruptible-switching memory to identify which one of an uninterruptible-switching desiring packet, a low-delay desiring packet and a marker packet the read-out packet corresponds to, and transmitting the read-out packet when the read-out packet is an uninterruptible-switching desiring packet or a marker packet, and discarding the packet read out from the uninterruptible-switching memory, when the read-out packet is a low-delay desiring packet, and further reading out and outputting a packet when the packet is stored in the low-delay memory.

According to the fourth solving means of the present invention, there is provided a packet transfer method in a packet transfer device that transmits input packets by using a redundancy configuration of plural systems, and selects and outputs packets for one transmission path at a reception side in a packet transfer network, comprising steps of:

delaying an input packet by a specified time and outputting the delayed packet to an uninterruptible-switching memory by a delay unit;

referring to a tag added to a received packet to identify which one of an uninterruptible-switching desiring packet, a low-delay desiring packet and a marker packet the received packet corresponds to, transmitting received uninterruptible-switching desiring packets, low-delay desiring packets and marker packet to the delay unit, transmitting only low-delay desiring packets to a low-delay memory, and extracting and outputting a reception time and identification information of a marker packet when the received packet corresponds to the marker packet;

measuring a packet arrival time difference between a 0-system and a 1-system on the basis of the reception time and the identification information of the marker packet, instructing the packet arrival time difference to the delay unit to make uninterruptible-switching desiring packets of the 0-system and the 1-system be in phase with each other and transmitting the uninterruptible-switching desiring packets from the delay unit to the uninterruptible-switching memory;

reading out a packet from the uninterruptible-switching memory, referring to a tag of the packet read out from the uninterruptible-switching memory to identify which one of an uninterruptible-switching desiring packet, a low-delay desiring packet and a marker packet the read-out packet corresponds to, and transmitting the read-out packet when the read-out packet is an uninterruptible-switching desiring packet or a marker packet, discarding the packet read out from the uninterruptible-switching memory, when the read-out packet is a low-delay desiring packet, and further reading out and outputting a packet when the packet is stored in the low-delay memory, and obtaining an empty time length preceding to incoming of a next uninterruptible-switching desired packet or a marker packet in the uninterruptible-switching memory, and comparing the obtained empty time length and a packet length of a packet which has been read out from the low-delay memory and held in the read-out controller without being transmitted or a packet length of the packet read out from the low-delay memory when no packet is held in the read-out controller, and transmitting the packet when the packet length of the packet is shorter than or equal to the empty time length or holds the packet when the packet length is conversely longer than the empty time length.

According to the present invention, user packets which desire uninterruptible switching and user packets which desire low delay can be accommodated with being mixed in the same device, and the uninterruptible-switching desiring packets are processed through the processing procedure for the uninterruptible-switching desiring packets. Therefore, the uninterruptible switching can be performed. Furthermore, with respect to the uninterruptible-switching desiring packets, packets transmitted through all paths can be set to be in phase in the device. Therefore, burst transmission of output packets can be avoided. With respect to low-delay desiring packets, the packets are transmitted while bypassing delay processing caused by the uninterruptible-switching function, so that the packets can be transferred without being delayed due to the uninterruptible switching function.

Furthermore, a network manager can operate two types of packet transfer networks of a packet transfer network for uninterruptible switching and a packet transfer network for low delay by using one packet transfer network. Therefore, the operation cost can be reduced and the system maintenance can be enhanced by integrating facilities introduced every service.

BRIEF DESCRIPTION OF THE DRAWINGS

FIG. 4 is a diagram showing an example of values to be added to tags;

FIG. 6 is a diagram showing the operation of a packet type identifying unit;

FIG. 20 is a diagram showing a user type storing unit 235.

DETAILED DESCRIPTION OF THE PREFERRED EMBODIMENTS

Preferred embodiments according to the present invention will be described hereunder with reference to the accompanying drawings.

1. System

Figure 1:
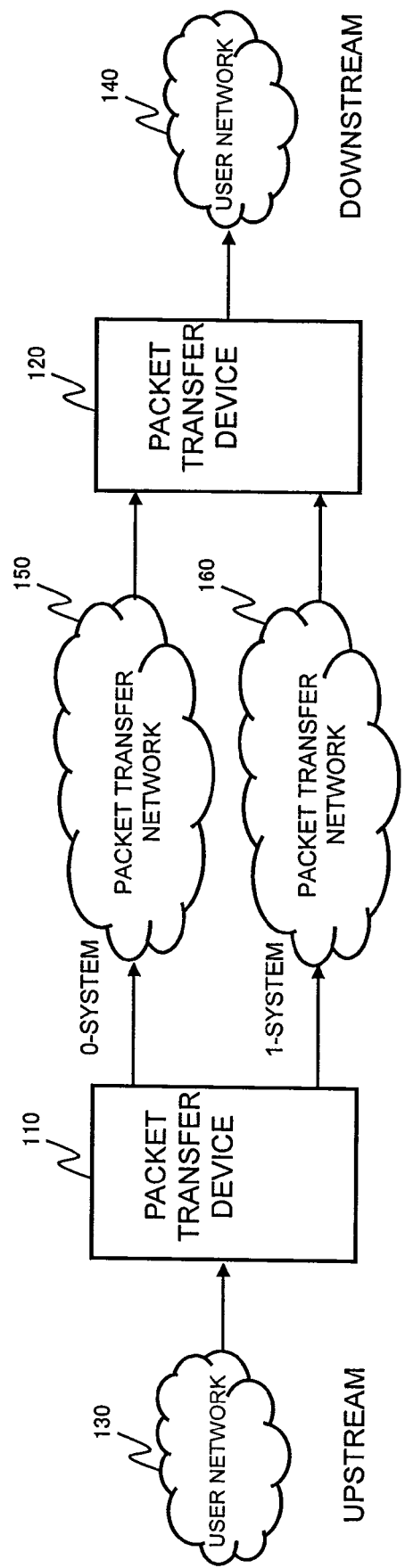
FIG. 1 is a diagram showing the construction of a packet transfer system according to an embodiment of the present invention.

FIG. 1 is a diagram showing the construction of a packet transfer system according to an embodiment of the present invention. As shown in FIG. 1, the packet transfer system according to this embodiment has packet transfer devices 110 and 120, user networks 130 and 140 and packet transfer networks 150 and 160. The packet transfer device 110 and the packet transfer device 120 are connected to each other through the packet transfer network 150 and the packet transfer network 160. Each of the packet transfer networks 150 and 160 is a network for transferring packets such as an IP network, or Ethernet (registered trademark).

Each of the packet transfer devices 110 and 120 has a function part for transmitting packets and a function part for receiving packets. In the following description, it is assumed that the packet transfer device 110 serves as a packet transfer device at a transmission side and the packet transfer device 120 serves as a packet transfer device at a reception side. Each of a packet input side (called as an upstream side) of the packet transfer device 110 and a packet output side (called as a downstream side) of the packet transfer device 120 is connected to the user network, for example.

The packet transfer device 110 copies each packet transmitted from the user network 130, and transmits two same packets to the different packet transfer networks 150 and 160, respectively. The two packet transfer networks, that is, the packet transfer networks 150 and 160 are shown in FIG. 1, however, the same packet transfer network may be used for the connection between the packet transfer device 110 and the packet transfer device 120. It is desired that the packet transfer device 110 and the packet transfer device 120 are connected to each other through physically different transmission paths, however, they may be connected to each other through transmission paths which are physically identical to each other, but logically different from each other.

A system in which the packet transfer devices 110 and 120 are connected to each other through the packet transfer network 150 is referred to as "0-system", and a system in which the packet transfer devices 110 and 120 are connected to each other through the packet transfer network 160 is referred to as "1-system". The embodiment of the present invention will be described by using a case where the two systems of the 0-system and the 1-system are applied. However, the present invention is applicable with respect to a case where three or more systems are applied.

The packet transfer device 120 receives packets transmitted through the packet transfer network 150 (i.e., packets of the 0-system) and packets transmitted through the packet transfer network 160 (i.e., packets of the 1-system). The packet transfer device 120 further selects a packet of any one of the 0-system and the 1-system, and transmits the selected packet to the user network 140 at the downstream side.

Figure 2:
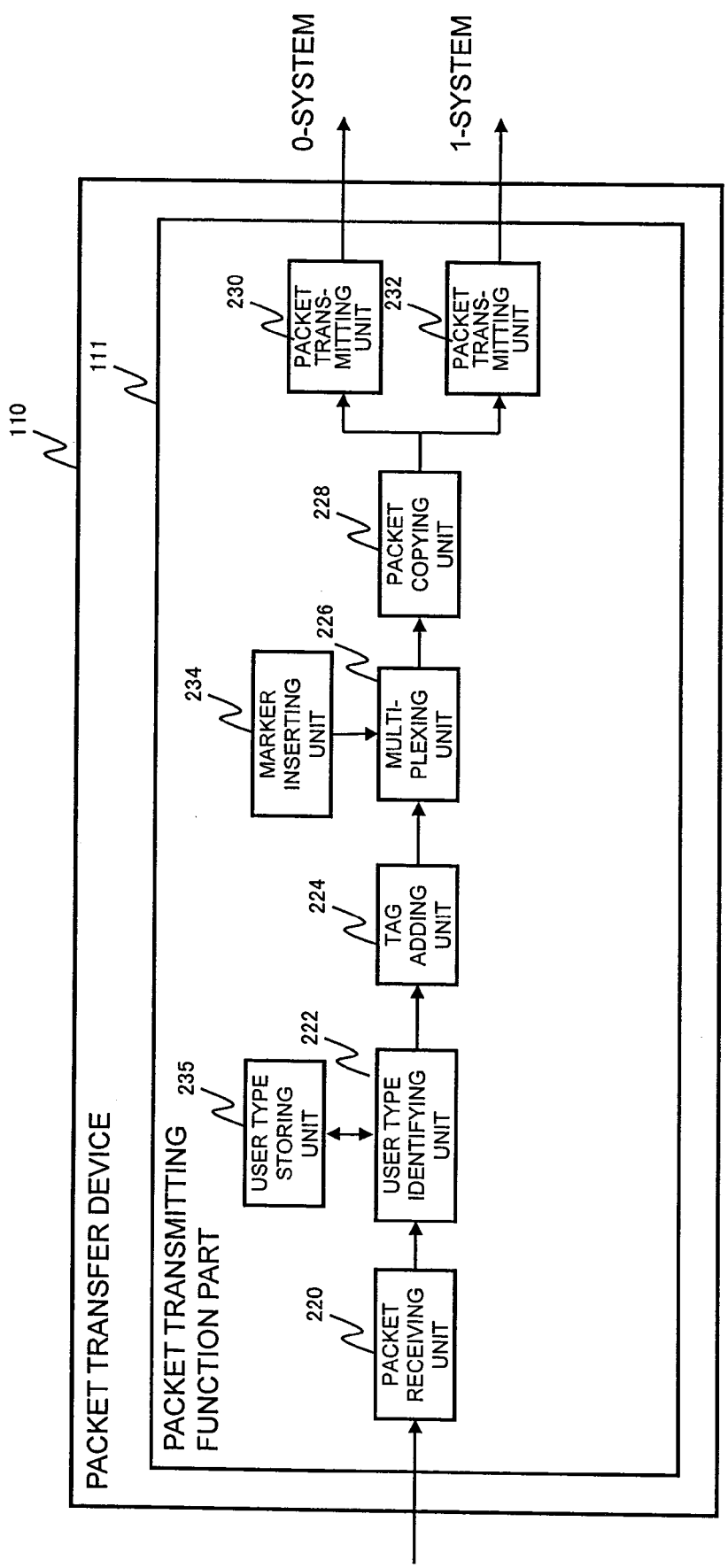
FIG. 2 is a block diagram showing an example of the construction of a packet transmitting function part of a packet transfer device.

FIG. 2 is a block diagram showing an example of the construction of a packet transmitting function part 111 of the packet transfer device 110. The packet transmitting function part 111 has a packet receiving unit 220, a user type identifying unit 222, a tag adding unit 224, a multiplexing unit 226, a packet copying unit 228, packet transmitting units 230 and 232, a marker inserting unit 234 and a user type storing unit 235.

The packet receiving unit 220 is an interface for receiving packets transmitted from the user network 130. The user type storing unit 235 is a storing unit in which user type information representing which one of "uninterruptible switching" and "low delay" is given priority by a user is stored in association with each user identification information. The user type identifying unit 222 is a block for referring to the user type storing unit 235 to determine whether a received user packet is a packet of a user who desires "uninterruptible switching" (hereinafter referred to as "uninterruptible-switching desiring packet") or a packet of a user who desires "low delay" (hereinafter referred to as "low-delay desiring packet"). On the basis of a determination result of the user type determining unit 222, the tag adding unit 224 adds the received user packet with a tag for identifying an uninterruptible-switching desiring packet or a low-delay desiring packet. The marker inserting unit 234 creates a marker packet used for delay amount measurement, uninterruptible switching, etc. while adding the marker packet with a tag for identifying the marker packet, and transmits the thus-created marker packet to the multiplexing unit 226. The marker packet may be created periodically or at any timing. The multiplexing unit 226 multiplexes a user packet transmitted from the tag adding unit 224 and a marker packet transmitted from the marker inserting unit 234, and transmits the multiplexed resultant packet to the packet copying unit 228. The packet copying unit 228 copies the packet from the multiplexing unit 226 into two same packets, and transmits these two packets to the packet transmitting units 230 and 232, respectively. The packet transmitting unit 230 transmits one of the packets to the packet transfer network 150, and the packet transmitting unit 232 transmits the other packet to the packet transfer network 160.

Figure 3:
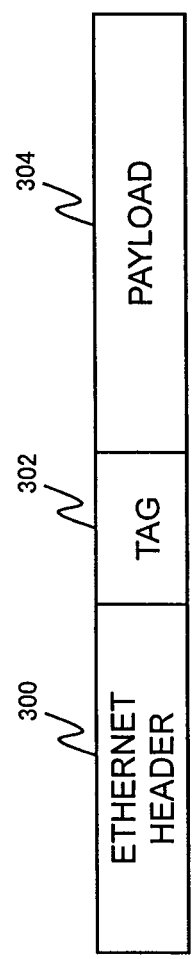
FIG. 3 is a diagram showing an example of the structure of a packet transmitted/received between packet transfer devices.

FIG. 3 shows an example of a packet structure when a packet to be transmitted is a packet of Ethernet (registered trademark). The packet has an Ethernet (registered trademark) header 300, a tag 302 and a payload 304. The Ethernet (registered trademark) header 300 and the payload 304 are normal constituent elements of Ethernet, and the packet is transmitted in such a format that the tag 302 is added to these constituent elements of Ethernet (registered trademark). The tag 302 is used to identify which one of an uninterruptible-switching desiring packet, a low-delay desiring packet and a marker packet a packet to be transmitted corresponds to. When the packet is a marker packet, a sequence number is written into the payload 304.

The tag is added as follows.

Uninterruptible-switching desiring packets and low-delay desiring packets are transmitted from the user network 130 while mixed with one another. The packet transfer device 110 refers to the user type storing unit 235 on the basis of a port which received the packets and a value of a user VLAN tag (user identification information) of a transmitted Ethernet (registered trademark) packet to identify whether the received packet is an uninterruptible-switching desiring packet or a low-delay desiring packet, and adds the packet concerned with the tag 302 affixed with a characteristic value of the uninterruptible-switching desiring packet or the low-delay desiring packet in accordance with an identification result of the packet transfer device 110. The marker packet is added with the tag 302 which is affixed with a characteristic value different from those of the uninterruptible-switching desiring packet and the low-delay desiring packet.

FIG. 20 is a diagram showing the user type storing unit 235.

The user type storing unit 235 is a storing unit in which user type information representing which one of "uninterruptible switching" and "low delay" is given priority by a user is stored in association with each user identification information. This information may be predetermined.

FIG. 4 is a diagram showing an example of an added tag value of the tag 302. In the example of FIG. 4, a tag having a value "1" is added to each uninterruptible-switching desiring packet, a tag having a value "2" is added to each low-delay desiring packet and a tag having a value "3" is added to each marker packet. Accordingly, three types of packets can be discriminated from one another.

Figure 5:
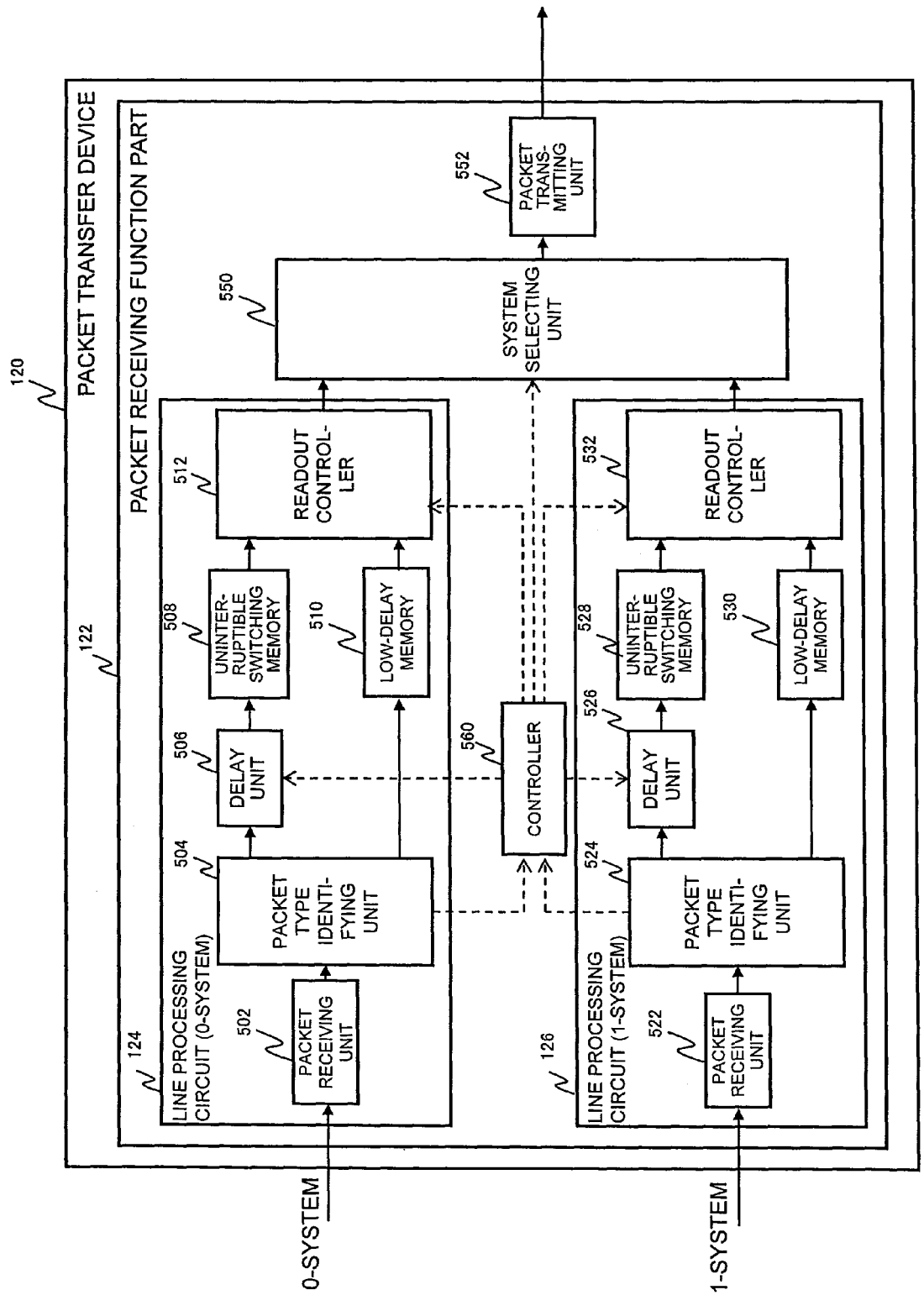
FIG. 5 is a block diagram showing an example of the construction of a packet receiving function part of the packet transfer device.

FIG. 5 is a block diagram showing an example of the construction of a packet receiving function part 122 of the packet transfer device 120.

The packet receiving function part 122 has a line processing circuit (0-system) 124, a line processing circuit (1-system) 126, a system selecting unit 550, a packet transmitting unit 552 and a controller 560. In FIG. 5, only the line processing circuit is dually configured, however, each of the system selecting unit 550, the packet transmitting unit 552 and the controller 560 may be dually configured.

The line processing circuit (0-system) 124 has a packet receiving unit 502, a packet type identifying unit 504, a delay unit 506, a memory 508 for uninterruptible switching (hereinafter referred to as an uninterruptible-switching memory), a memory 510 for low delay (hereinafter referred to as a low-delay memory) and a read-out controller 512.

The line processing circuit (1-system) 126 has a packet receiving unit 522, a packet type identifying unit 524, a delay unit 526, a memory 528 for uninterruptible switching (hereinafter referred to as an uninterruptible-switching memory), a memory 530 for low delay (hereinafter referred to as a low-delay memory), and a read-out controller 532.

The packet receiving unit 502 is an interface for receiving packets transmitted from the packet transfer network 150, and the packet receiving unit 522 is an interface for receiving packets transmitted from the packet transfer network 160. With respect to the 0-system, a packet received by the packet receiving unit 502 is transmitted to the packet type identifying unit 504. The packet type identifying unit 504 refers to the tag 302 added to the received packet to identify which one of an uninterruptible-switching desiring packet, a low-delay desiring packet and a marker packet the received packet corresponds to, and transmits the packet to the delay unit 506 and/or the low-delay memory 510. The details of the packet transmission will be described later with reference to FIG. 6.

Furthermore, when a received packet is a marker packet, the packet type identifying unit 504 informs the controller 560 of information on a marker packet reception time and a sequence number written in the payload 304 of the marker packet. The same processing is executed in both the 1-system and the 0-system. That is, the packet type identifying unit 524 refers to the tag 302 added to a received packet to identify which one of an uninterruptible-switching desiring packet, a low-delay desiring packet and a marker packet the packet corresponds to, and transmits the packet to the delay unit 526 and the low-delay memory 530. Furthermore, when the packet received by the packet type identifying unit 524 is a marker packet, the packet type identifying unit 524 informs the controller 560 of information on a marker packet reception time and a sequence number written in the payload 304 of the marker packet.

The controller 560 measures a packet arrival time difference between the two systems (the 0-system and the 1-system) on the basis of the marker packet reception times and the sequence numbers of the respective systems which are transmitted from the packet type identifying units 504 and 524, delays packets by using the delay units 506 and 526 so that the packets of the 0-system and the packets of the 1-system are coincident with each other in phase, and transmits these packets to the uninterruptible-switching memories 508 and 528. The controller 560 informs the read-out controllers 512 and 532 of information of an earlier arrival system and a later arrival system.

The uninterruptible-switching memories 508 and 528 and the low-delay memories 510 and 530 are used as First In First Out (FIFO). With respect to the 0-system, the read-out controller 512 reads out a packet from the uninterruptible-switching memory 508 or the low-delay memory 510 and transmits the read-out packet to the system selecting unit 550. With respect to the 1-system, the read-out controller 532 reads out a packet from the uninterruptible-switching memory 528 or the low-delay memory 530, and transmits the read-out packet to the system selecting unit 550.

When the 0-system is selected on the basis of an instruction of the controller 560, the system selecting unit 550 transmits the packet transmitted from the read-out controller 512 to the packet transmitting unit 552, and discards the packet transmitted from the read-out controller 532. On the other hand, when the 1-system is selected on the basis of an instruction of the controller 560, the system selecting unit 550 transmits the packet transmitted from the read-out controller 532 to the packet transmitting unit 552, and discards the packet transmitted from the read-out controller 512. The packet transmitting unit 552 serves as an interface for transmitting packets to the user network 140.

FIG. 6 is a diagram showing the operation of each of the packet type identifying units 504 and 524. The operation of the 0-system is identical to the operation of the 1-system, and thus the operation of the packet type identifying unit 504 of the 0-system will be representatively described hereunder.

There are three types of packets, that is, an uninterruptible-switching desiring packet, a low-delay desiring packet and a marker packet as packets to be input to the packet type identifying unit 504. When a received packet is an uninterruptible-switching desiring packet, the packet is transmitted to only the delay unit 506, and the packet is not transmitted to the low-delay memory 510. On the other hand, when a received packet is a low-delay desiring packet, the packet is transmitted to both the delay unit 506 and the low-delay memory 510. When a received packet is a marker packet, the packet is transmitted to only the delay unit 506, and the packet is not transmitted to the low-delay memory 510. That is, all received packets are transmitted to the delay unit 506, however, only low-delay desiring packets are transmitted to the low-delay memory 510.

The reason why low-delay desiring packets are also transmitted to the delay unit 506, that is, the uninterruptible-switching memory 508 resides in that a temporal arrangement of a train of arrival packets is held in the uninterruptible-switching memory 508 and fluctuation of uninterruptible-switching desiring packets and marker packets is reduced. Therefore, in place of the method of making low-delay desiring packets input to the delay unit 506 as described above, the following method may be applied. That is, respective arrival times of uninterruptible-switching desiring packets and marker packets are held in advance, and the uninterruptible-switching desiring packets and the marker packets are read out from the uninterruptible-switching memory 508 so that the temporal arrangement of the packets at a read-out time does not vary from that of the packets at an arrival time.

Figure 7:
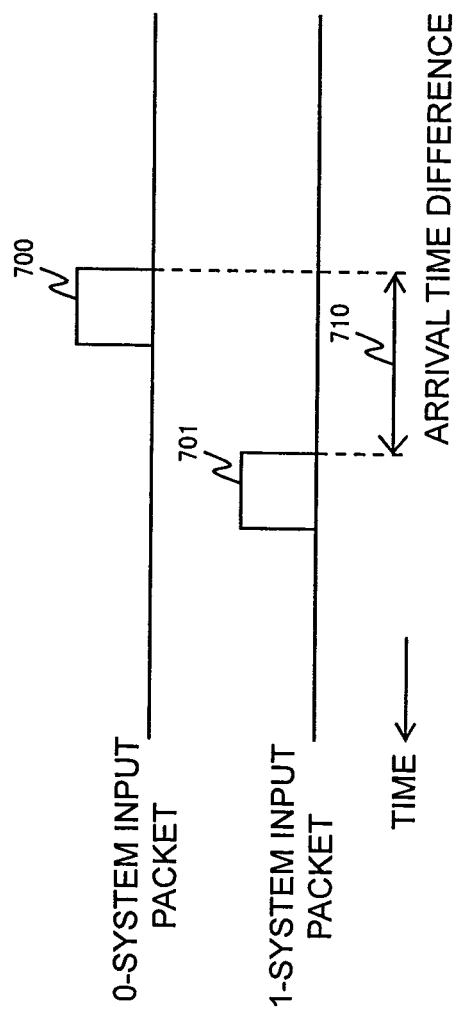
FIG. 7 is a diagram showing a unit for measuring a packet arrival time difference between two systems.

FIG. 7 is a diagram showing a method of measuring the packet arrival time difference between two systems.

It is assumed that a packet 700 is a marker packet arriving at the packet type identifying unit 504, a packet 701 is a marker packet arriving at the packet type identifying unit 524 and the same sequence number is written in the packets 700 and 701. The controller 560 measures an arrival time difference 710 between the packet of the 0-system and the packet of the 1-system on the basis of the sequence numbers and the arrival times of the marker packets transmitted from the packet type identifying units 504 and 524. It is shown in FIG. 7 that the packet arrival time of the 0-system is earlier than that of the 1-system.

Figure 8:
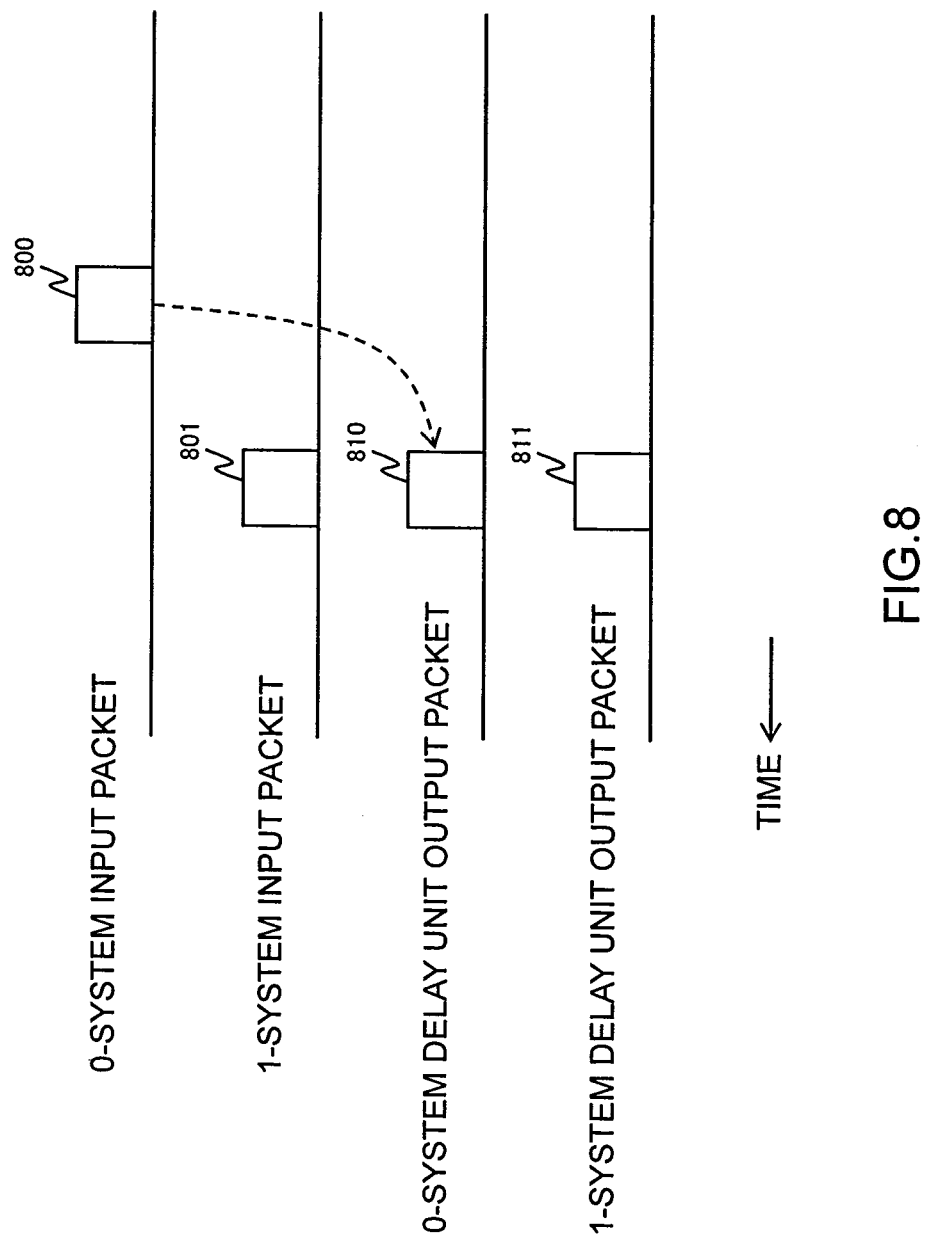
FIG. 8 is a diagram showing the operation of a delay unit.

FIG. 8 is a diagram showing the operation of each of the delay units 506 and 526.

A packet 800 represents a packet input to the delay unit 506, a packet 801 represents a packet input to the delay unit 526, a packet 810 represents a packet output from the delay unit 506 and a packet 811 represents a packet output from the delay unit 526. The packet of the 0-system is input to the delay unit 506 earlier than the packet of the 1-system is input to the delay unit 526, however, the output packets 810 and 811 from the delay units 506 and 526 are set to be in phase with each other by applying to the 0-system packet the same delay time as the packet arrival time difference 710 between the two systems which is measured by the controller 560.

Figure 9:
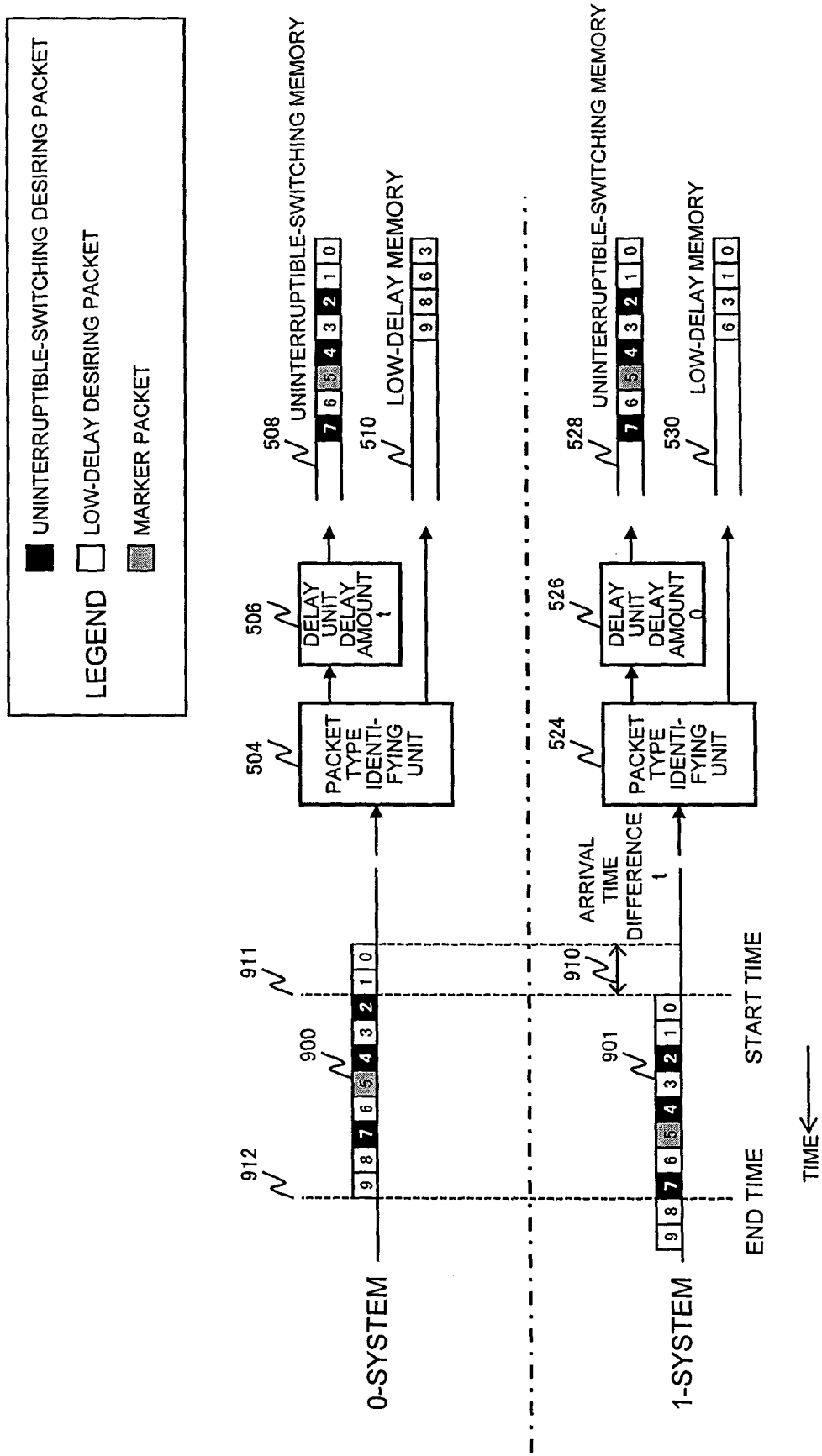
FIG. 9 is a diagram showing the operation of storing packets into a memory for uninterruptible switching and a memory for low delay.

FIG. 9 is a diagram showing the operation of storing packets into the uninterruptible-switching memories 508 and 528 and the low-delay memories 510 and 530. A packet train 900 represents a train of packets input to the 0-system, and a packet train 901 represents a train of packets input to the 1-system. The packets are assumed to have a fixed length. The uninterruptible-switching desiring packet, the low-delay desiring packet and the marker packet are respectively represented by packet colors shown in a legend, and packets are marked with digits (0 to 9) to describe this operation. In the example of FIG. 9, the packet train 900 of the 0-system arrives earlier by an arrival time difference t 910 than the packet train 901 of the 1-system.

According to the method described with reference to FIGS. 6 to 8, the packet train 900 of the 0-system is stored in the uninterruptible-switching memory 508 and the low-delay memory 510, and the packet train 901 of the 1-system is stored in the uninterruptible-switching memory 528 and the low-delay memory 530. When a start time is set to a time represented by 911 and an end time is set to a time represented by 912 in FIG. 9, a train of packets to be stored in the uninterruptible-switching memory 508 of the 0-system is delayed by a delay amount t in the delay unit 506 and then stored into the uninterruptible-switching memory 508. Therefore, the packet train is changed to a train of packets having packet numbers 0 to 7, that is, a train of packets having packet numbers 0 to 7 is stored in the uninterruptible-switching memory 508. On the other hand, a train of packets to be stored in the low-delay memory 510 is not delayed, and thus the packet train is changed into a train of packets having packet numbers 3, 6, 8 and 9 (packets of packet numbers 0 and 1 have been already transmitted) from the start time 911, that is, a train of packets of packet numbers 3, 6, 8 and 9 is stored in the low-delay memory 510. Furthermore, a train of packets to be stored in the uninterruptible-switching memory 528 of the 1-system is not delayed in the delay unit 526, and thus directly stored in the uninterruptible-switching memory 528. Therefore, this packet train is changed into a train of packets having packet numbers 0 to 7, that is, a train of packets having packet numbers 0 to 7 is stored in the uninterruptible-switching memory 528. On the other hand, a train of packets to be stored in the low-delay memory 530 is changed into a train of packets having packet numbers 0, 1, 3 and 6 (packets of packet numbers 8 and 9 have not yet arrived), that is, a train of packets having packet numbers 0, 1, 3 and 6 is stored in the low-delay memory 530.

The packet trains stored in the uninterruptible-switching memories 508 and 528 are in phase with each other, however, the packet trains stored in the low-delay memories 510 and 530 are not in phase with each other because it is unnecessary to make these packet trains be in phase with each other.

2. Processing of Read-Out Controller: Fixed Value

Figure 10:
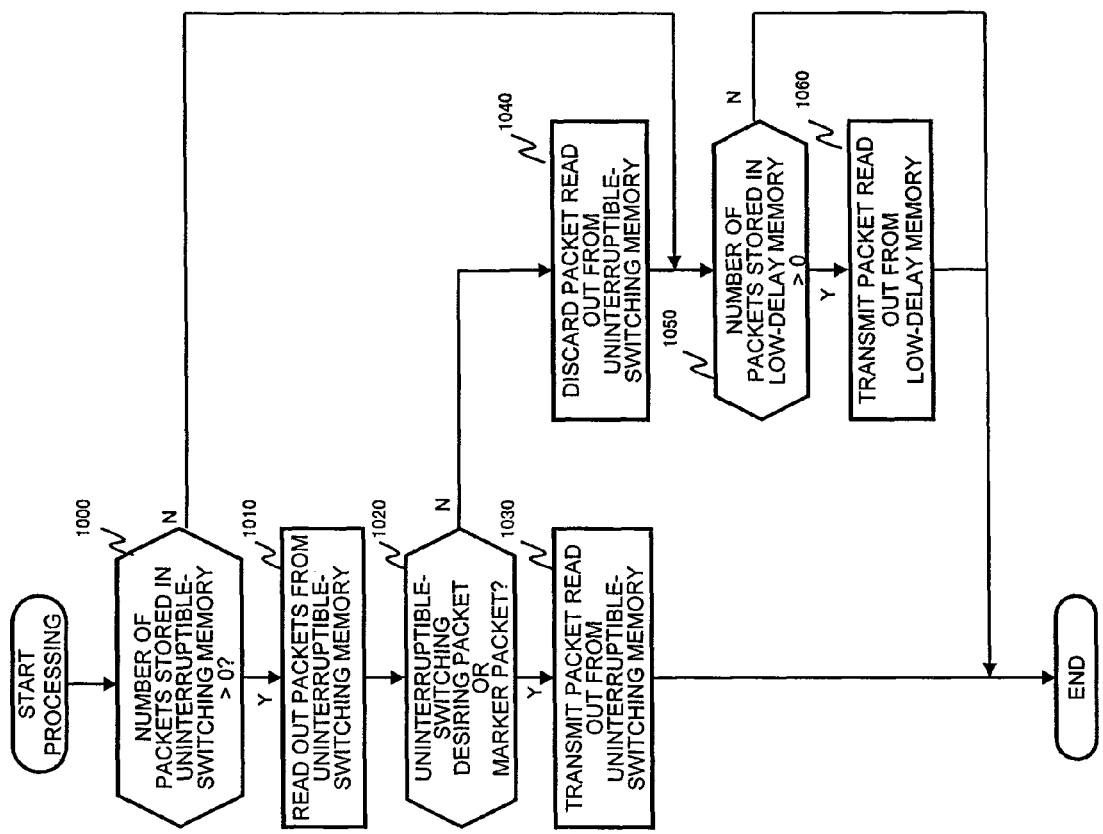
FIG. 10 is a flowchart showing a processing procedure of a read-out controller when the length of packets is fixed.

FIG. 10 is a flowchart showing a processing procedure of the read-out controllers 512 and 532. The operation of the 0-system is identical to the operation of the 1-system, and thus only the operation of the read-out controller 512 of the 0-system will be described hereunder.

The read-out controller 512 checks the number of packets stored in the uninterruptible-switching memory 508 (sequence 1000). When some packet is stored in the uninterruptible-switching memory 508, the read-out controller 512 reads out the packet (sequence 1010). Subsequently, it is identified by referring to the tag 302 of the packet whether the packet read out from the uninterruptible-switching memory 508 is an uninterruptible-switching desiring packet, a low-delay desiring packet or a marker packet (sequence 1020). When the read-out packet is an uninterruptible-switching desiring packet or a marker packet, the read-out packet is directly transmitted (sequence 1030). When the read-out packet is a low-delay desiring packet in sequence 1020, the packet read out from the uninterruptible-switching memory 508 is discarded (sequence 1040). When no packet is stored in the uninterruptible-switching memory 508 in sequence 1000 or when the packet read out from the uninterruptible-switching memory 508 is a low-delay desiring packet in sequence 1020, the processing of sequence 1050 is executed. In sequence 1050, the number of packets stored in the low-delay memory 510 is checked, and when some packet is stored in the low-delay memory 510, the packet is read out and transmitted (sequence 1060). When no packet is stored in the low-delay memory 510, the processing is finished.

Figure 11:
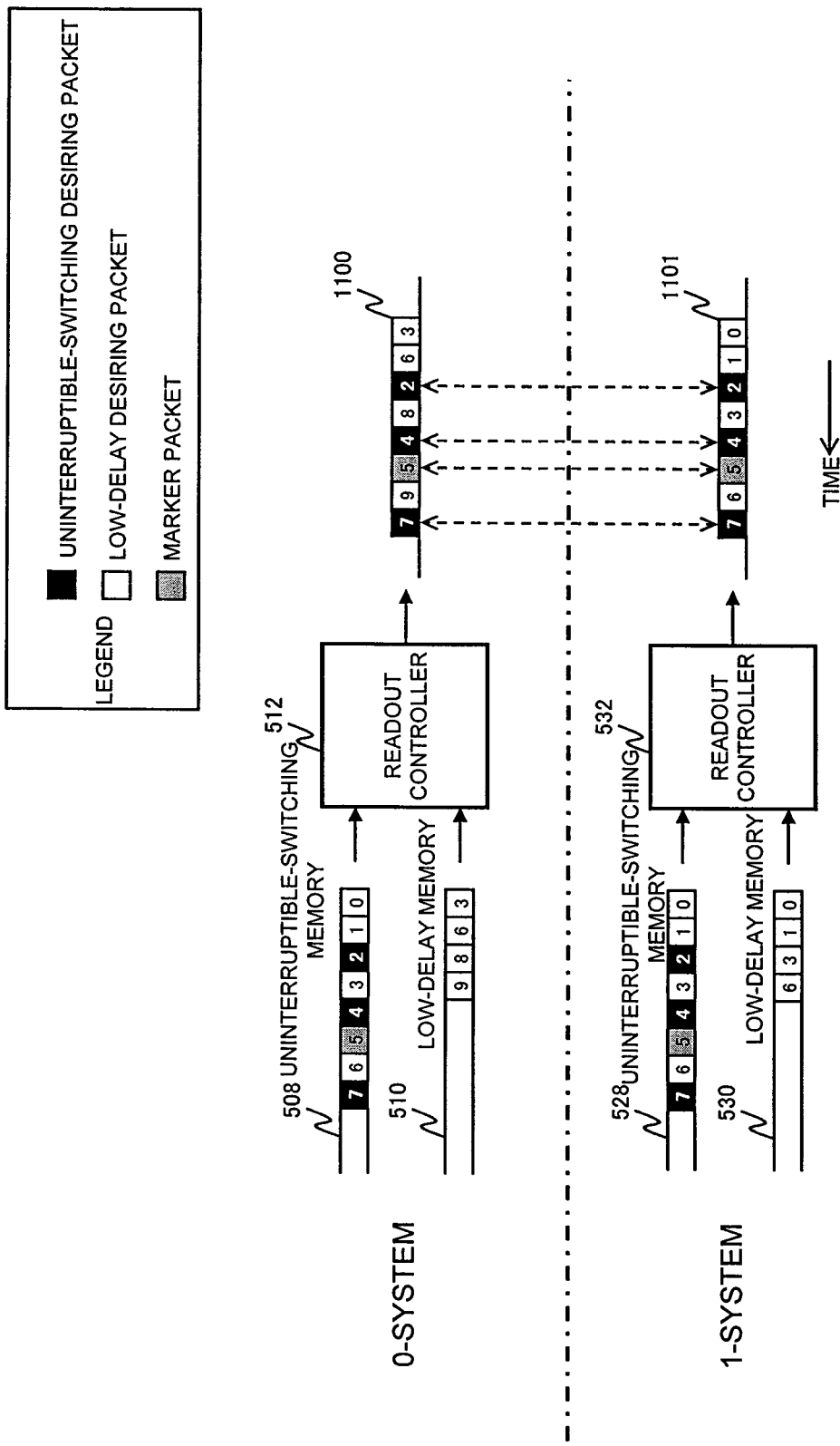
FIG. 11 is a diagram showing an output from the read-out controller when the length of packets is fixed.

FIG. 11 is a diagram showing the operation of outputting a packet according to the processing procedure of the read-out controllers 512 and 532 described with reference to FIG. 10. It is assumed that packets shown in FIG. 11 are stored in the uninterruptible-switching memories 508 and 528 and the low-delay memories 510 and 530.

In the 0-system, the read-out controller 512 checks the number of packets stored in the uninterruptible-switching memory 508, and reads out a packet of packet number 0 because some packet is stored. The packet of the packet number 0 is discarded because it is a low-delay desiring packet, and a packet of packet number 3 is read out from the low-delay memory 510 and transmitted. Subsequently, a packet of packet number 1 read out from the uninterruptible-switching memory 508 is discarded because it is also a low-delay desiring packet, and a packet of packet number 6 is read out from the low-delay desiring memory 510 and transmitted. Subsequently, a packet of packet number 2 read out from the uninterruptible-switching memory 508 is directly transmitted because it is an uninterruptible-switching desiring packet. The same procedure is subsequently repeated, whereby an output packet train 1100 of the 0-system is output in a packet order shown in FIG. 11. The same procedure is repeated for the 1-system, whereby an output packet train 1101 of the 1-system is output in a packet order shown in FIG. 11.

According to this procedure, with respect to the 0-system as the earlier arrival system, the low-delay desiring packets can be transmitted earlier than the uninterruptible-switching desiring packets which undergo a fixed delay (that is, which are delayed by a fixed delay amount). Furthermore, in the packet trains 1100 and 1101, the corresponding uninterruptible-switching desiring packets are output at the same time position, and thus uninterruptible switching can be performed for the uninterruptible-switching desiring packets in the system selecting unit 550 at the subsequent stage.

Figure 12:
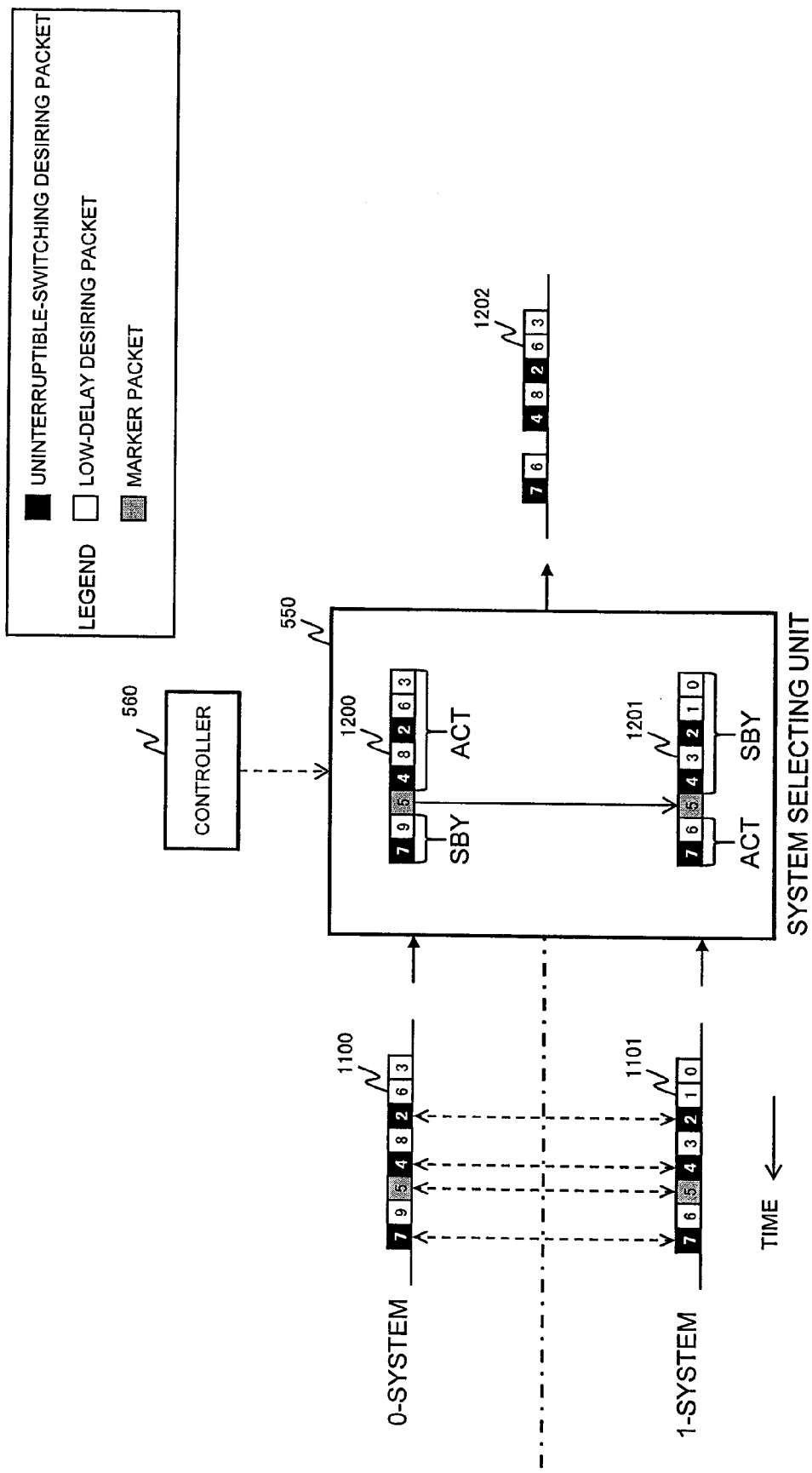
FIG. 12 is a diagram showing a system switching operation based on a manager's instruction.

FIG. 12 is a diagram showing the operation of switching the system on the basis of an instruction from the manager.

An operation of switching the system from a state of 0-system ACT/1-system SBY to a state of 1-system ACT/0-system SBY will be described. The packet train 1100 is input from the 0-system to the system selecting unit 550, and the packet train 1101 is input from the 1-system to the system selecting unit 550.

When receiving a system switching instruction from the controller 560, the system selecting unit 550 performs the system switching at a timing of a marker frame. The packets of packet numbers 3, 6, 2, 8 and 4 of a 0-system packet train 1200 are output because they are ACT (active), however, the packets of the 0-system packet train 1200 are set to SBY (standby) subsequently to the marker frame. Therefore, the packets of packet numbers 9 and 7 are discarded. On the other hand, the packets of packet numbers 0, 1, 2, 3 and 4 of a 1-system packet train 1201 are SBY and thus discarded. However, they are set to ACT subsequently to the marker frame, and thus the packets of packet numbers 6 and 7 are output. Accordingly, a packet train 1202 is output as an output packet train from the system selecting unit 550. In the packet train 1202, the packet temporal arrangement of the uninterruptible-switching desiring packets does not vary, and neither duplication nor lack occur in these packets. However, the temporal arrangement of the low-delay desiring packets may vary, and duplication or lack may occur in these packets.

The rear stage of the system selecting unit 550 is the user network 140 through the packet transmitting unit 552, and thus each packet is transmitted from the system selecting unit 550 while the tag 302 added to the packet is deleted. The system selecting unit 550 discards the marker packet irrespective of whether or not system switching is instructed from the controller 560.

3. Processing of Read-Out Controller: Variable Length (1)

The foregoing description relates to the case where the length of each packet is fixed. The following description will be made on a case where the length of each input packet is variable.

Figure 13:
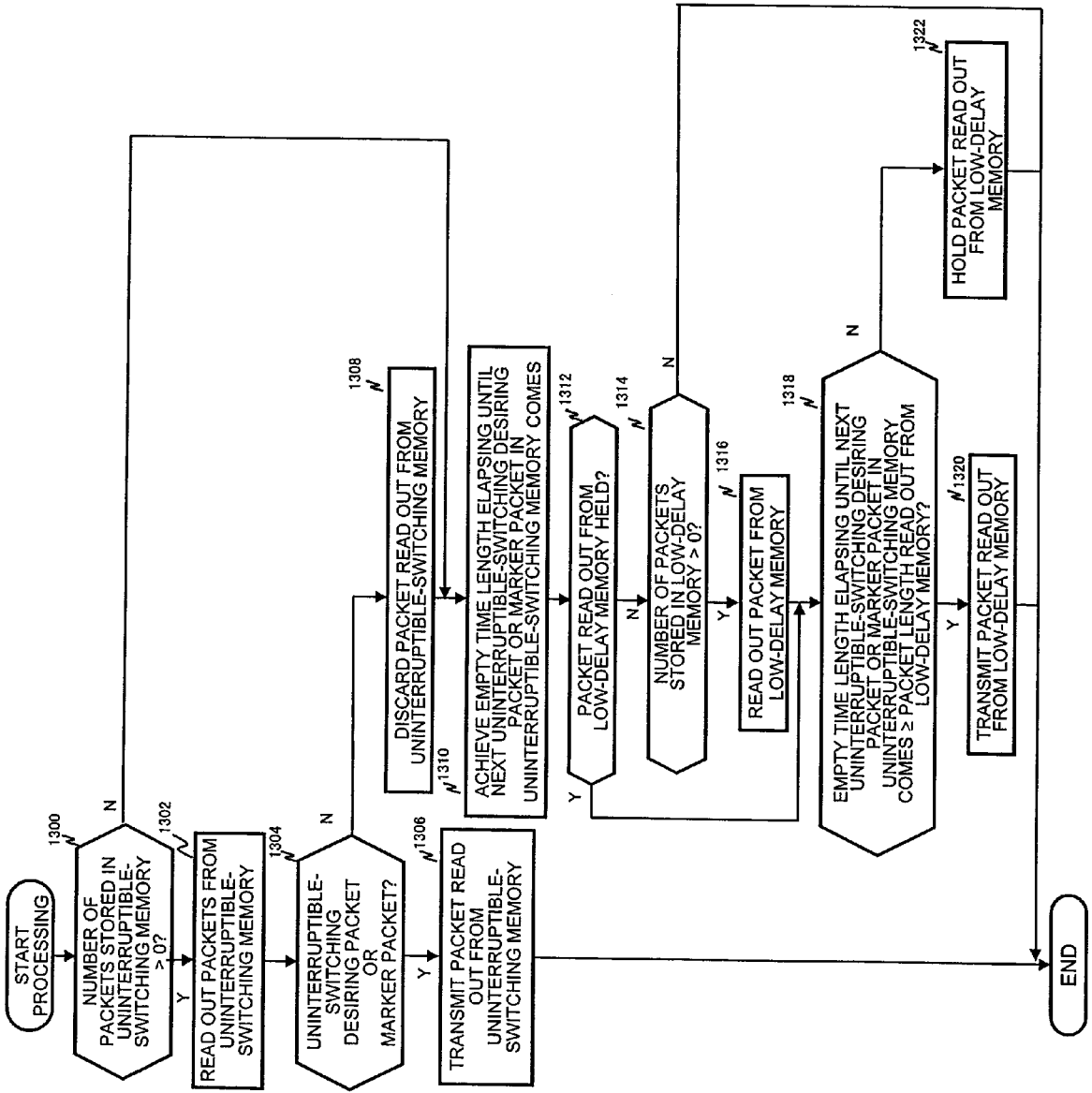
FIG. 13 is a flowchart showing a processing procedure of the read-out controller when the length of packets is variable.

FIG. 13 is a flowchart showing a processing procedure of the read-out controllers 512 and 532 when the length of each packet is variable. The operation of the 0-system and the operation of the 1-system are identical to each other, and thus only the operation of the read-out controller 512 of the 0-system will be described.

The read-out controller 512 checks the number of packets stored in the uninterruptible-switching memory 508 (sequence 1300). When some packet is stored, the read-out controller 512 reads out the packet (sequence 1302). The read-out controllers 512 and 532 can read out packets from the uninterruptible-switching memories 508 and 528 or the low-delay memories 510 and 530 at a predetermined fixed period timing. Subsequently, the read-out controller 512 refers to the tag 302 of the packet to identify whether the packet read out from the uninterruptible-switching memory 508 is an uninterruptible-switching desiring packet, a low-delay desiring packet or a marker packet (sequence 1304). When the read-out packet is an uninterruptible-switching desiring packet or a marker packet, the read-out packet is directly transmitted (sequence 1306). When the read-out packet is a low-delay desiring packet in sequence 1304, the packet read out from the uninterruptible-switching memory 508 is discarded (sequence 1308).

When no packet is stored in the uninterruptible-switching memory 508 in sequence 1300 or when the packet readout from the uninterruptible-switching memory 508 is a low-delay desiring packet in sequence 1304, the processing of sequence 1310 is executed. In sequence 1310, an empty time length from a time after a packet is transmitted or a time when the packet is transmitted till a time when a next uninterruptible-switching desiring packet or a marker packet arrives in the uninterruptible-switching memory is obtained. When neither uninterruptible-switching desiring packet nor marker packet is stored in the uninterruptible-switching memory, the maximum packet length which the packet transfer device 120 can process is set.

Subsequently, it is determined whether a packet which has been already read out from the low-delay memory, but has not yet been transmitted is held in an appropriate internal memory (sequence 1312). When some packet is held, the processing goes to sequence 1318, however, when no packet is held, the processing goes to sequence 1314 (the holding of a packet in the internal memory is performed in sequence 1322 or the like). In sequence 1314, the number of packets stored in the low-delay memory 510 is checked. When some packet is stored, the packet is read out (step 1316), and when no packet is stored, the processing is finished.

In sequence 1318, the empty time length achieved in sequence 1310 is compared with the packet length of the packet read out from the low-delay memory 510 in sequence 1316 or the packet length of the packet held in the internal memory. When the packet length of the packet read out from the low-delay memory 510 is shorter than or equal to the empty time length, the packet readout from the low-delay memory 510 or the packet held in the internal memory is transmitted (sequence 1320). Conversely, when the packet length of the packet read out from the low-delay memory 510 is longer than the empty time length, the packet readout from the low-delay memory 510 or the packet held in the internal memory is held (sequence 1322), and the processing is finished.

Figure 14:
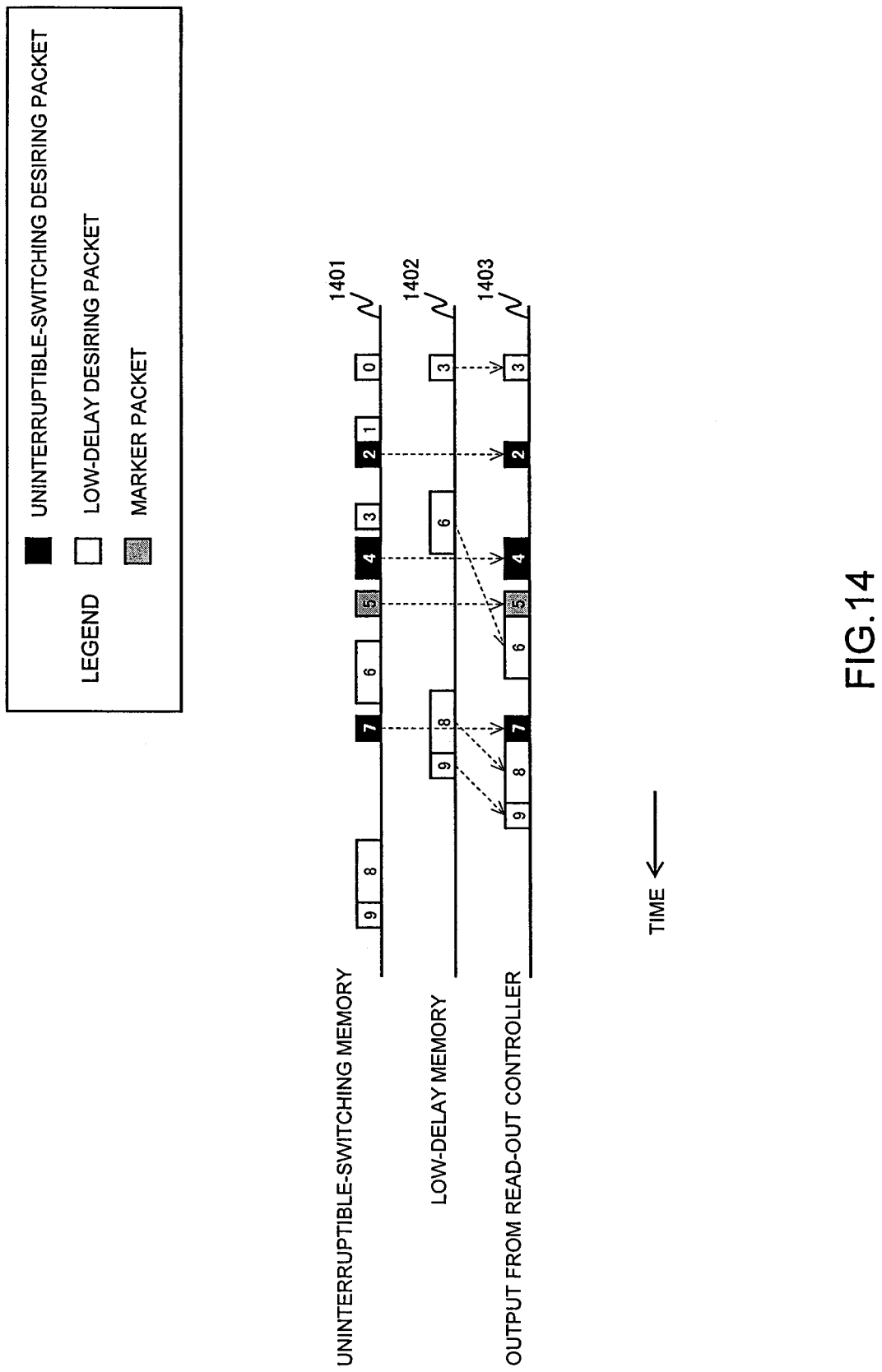
FIG. 14 is a time chart showing an output from the read-out controller when the length of packets is variable.

FIG. 14 is a diagram showing input/output of the read-out controller 512 when the processing is executed according to the flowchart of FIG. 13. In FIG. 14, an upper stage 1401 represents a train of packets input from the uninterruptible-switching memory 508, a middle stage 1402 represents a train of packets input from the low-delay memory 510, and a lower stage 1403 represents a train of packets output from the read-out controller 512. The operation (processing procedure) shown in FIG. 13 corresponds to the following operation shown in FIG. 14.

As shown in FIG. 14, an uninterruptible-switching desiring packet or a marker packet of the packet train 1401 is output in preference to the packet train 1402, and a packet of the packet train 1402 input from the low-delay memory 510 is output at an empty time between the uninterruptible-switching desiring packet or the marker packet of the packet train 1401 and a next uninterruptible-switching desiring packet or the marker packet of the packet train 1401.

In FIG. 14, the packet of packet number 0 of the packet train 1401 is discarded because it is a low-delay desiring packet (sequence 1308). At this time, the packet length of the packet having packet number 3 of the packet train 1402 input from the low-delay memory 510 is shorter than an empty time length elapsing till the packet of packet number 2 as a next uninterruptible-switching desiring packet in the uninterruptible-switching memory 508 comes to the read-out controller 512 (sequence 1318), and thus the packet of packet number 3 of the packet train 1402 is output (sequence 1320). The packet of packet number 1 of the packet train 1401 is discarded (sequence 1308), and no packet is stored in the low-delay memory 510 at this timing (sequence 1314), so that the processing is finished.

Subsequently, the packet of packet number 2 of the packet train 1401 is directly output because it is an uninterruptible-switching desiring packet (sequence 1306). Subsequently, the packet of packet number 3 of the packet train 1401 is discarded. At this time, with respect to the packet of packet number 6 of the packet train 1402 read out from the low-delay memory 510 (sequence 1316), the packet length of the packet of packet number 6 is longer than an empty time length elapsing till the packet of packet number 4 as a next uninterruptible-switching desiring packet in the uninterruptible-switching memory 508 comes to the read-out controller 512, and thus this packet is not output, but held in the read-out controller 512 (sequence 1322). The packets of packet numbers 4 and 5 of the packet train 1401 are directly output. When the packet of packet number 6 of the packet train 1401 is read out from the uninterruptible-switching memory 508, the packet of packet number 6 held in the sequence 1322 is output for a subsequent empty time between the packets of packet numbers 5 and 7 of the packet train 1401 (sequence 1320). Subsequently, the packet train 1403 is output by repeating the processing likewise.

According to this embodiment, the uninterruptible-switching desiring packets and the marker packet are output while the temporal arrangement thereof is kept, and the low-delay desiring packets are output by using empty times without undergoing any fixed delay.

4. Operation of Read-Out Controller: Variable Length (2)

Figure 15:
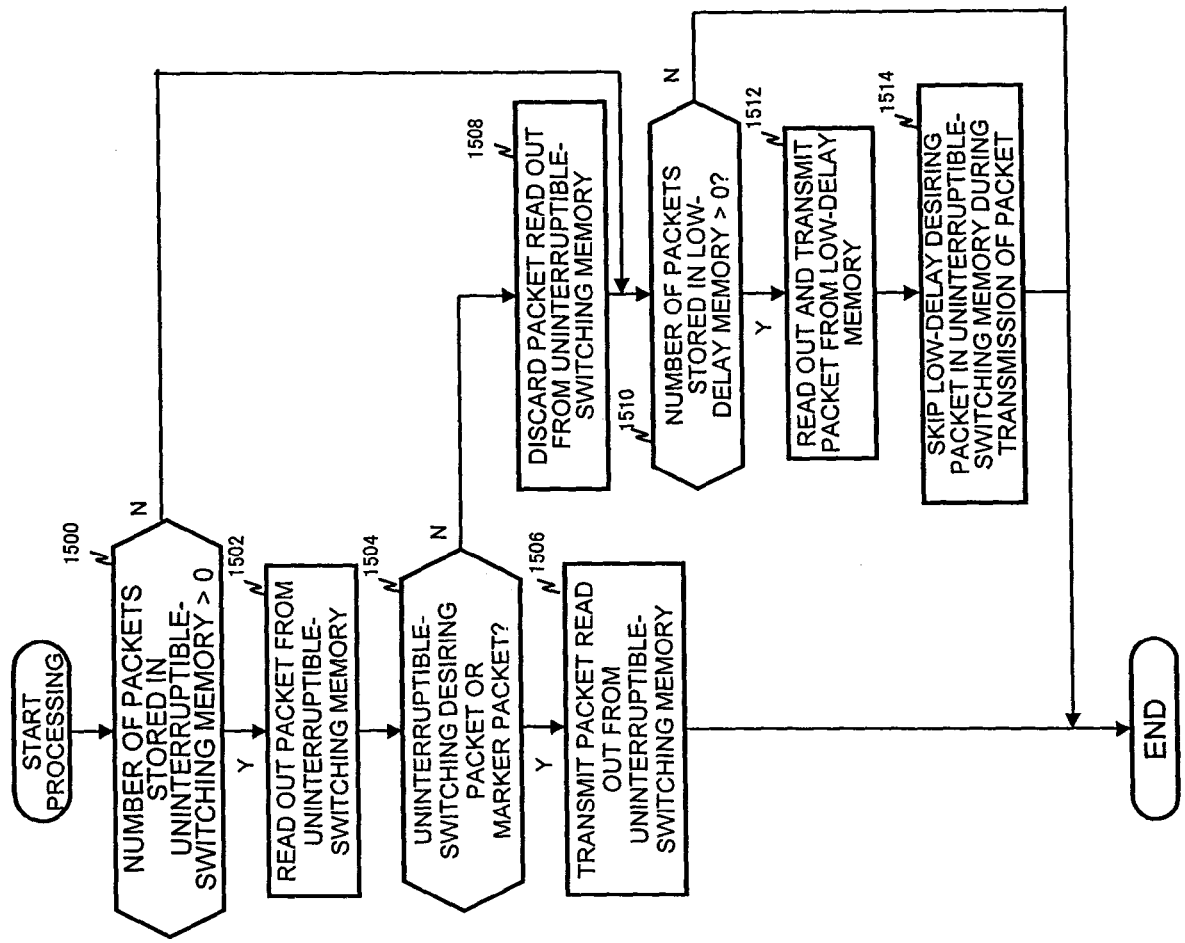
FIG. 15 is a flowchart showing a processing procedure when the length of packets is variable.
Figure 16:
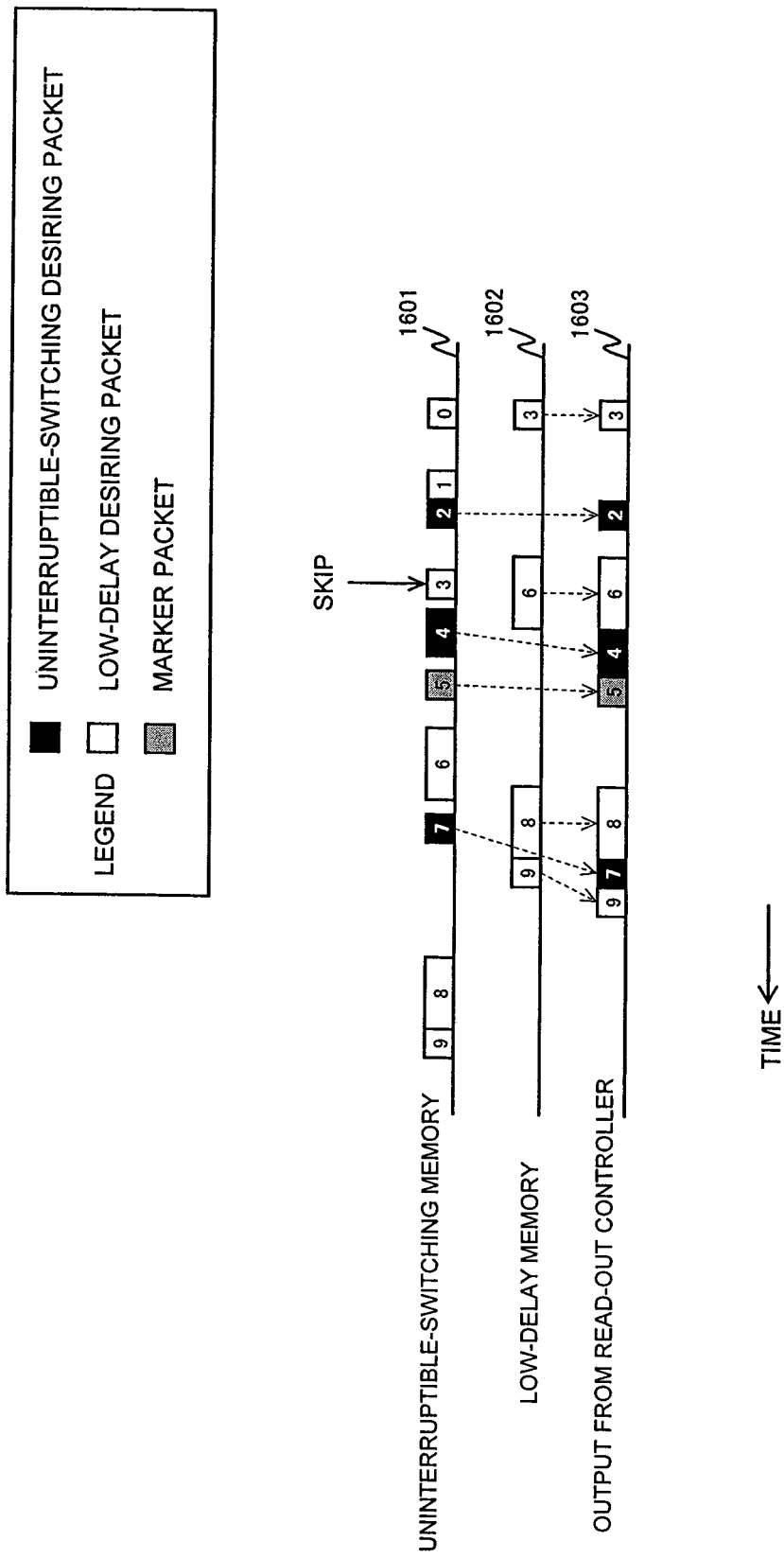
FIG. 16 is a time chart showing an output from the read-out controller when the length of packets is variable.

FIGS. 15 and 16 show another embodiment in which the length of each packet is variable.

FIG. 15 is a flowchart showing a processing procedure of the read-out controllers 512 and 532 which is different from the procedure of FIG. 13. The operation of the 0-system and the operation of the 1-system are identical to each other, and thus only the operation of the read-out controller 512 of the 0-system will be described hereunder.

The read-out controller 512 checks the number of packets stored in the uninterruptible-switching memory 508 (sequence 1500), and when some packet is stored, the read-out controller 512 read out the packet (sequence 1502). The read-out controllers 512 and 532 can read out packets from the uninterruptible-switching memories 508 and 528 or the low-delay memories 510 and 530 at a predetermined fixed period timing. Subsequently, the read-out controller 512 refers to the tag 302 of a read-out packet to identify whether the packet read out from the uninterruptible-switching memory 508 is an uninterruptible-switching desiring packet, a low-delay desiring packet or a marker packet (sequence 1504). When the read-out packet is an uninterruptible-switching desiring packet or a marker packet, the read-out packet is directly transmitted (sequence 1506). When the read-out packet is a low-delay desiring packet in sequence 1504, the packet read out from the uninterruptible-switching memory 508 is discarded (sequence 1508). When no packet is stored in the uninterruptible-switching memory 508 in sequence 1500 or when the packet read out from the uninterruptible-switching memory 508 is a low-delay desiring packet in sequence 1504, the processing of the sequence 1510 is executed. In sequence 1510, the number of packets stored in the low-delay memory 510 is checked, and when some packet is stored, the packet is read out and transmitted (sequence 1512). At the same time, a low-delay desiring packet which is within a packet transmission time and precedes a next uninterruptible-switching desiring packet in the uninterruptible-switching memory 508 is skipped (sequence 1514). When no packet is stored in sequence 1510, the processing is finished.

FIG. 16 is a diagram showing input/output of the controller 512 when the processing is executed according to the flowchart of FIG. 15.

In FIG. 16, an upper stage 1601 represents a train of packets input from the uninterruptible-switching memory 508, a middle stage 1602 represents a train of packets input from the low-delay memory 510 and a lower stage 1603 represents a train of packets output from the read-out controller 512. In FIG. 16, a packet of packet number 0 of the packet train 1601 is discarded because it is a low-delay desiring packet, and a packet of packet number 3 of the packet train 1602 input from the low-delay memory 510 is output (sequence 1512). A packet of packet number 1 of the packet train 1601 is discarded (sequence 1508). At this timing, no packet is stored in the low-delay memory 510 (sequence 1510), and thus the processing is finished. Subsequently, a packet of packet number 2 of the packet train 1601 is directly output because it is an uninterruptible-switching desiring packet (sequence 1506). Subsequently, at a timing between packets of packet numbers 2 and 3 of the packet train 1601, a packet of packet number 6 of the packet train 1602 is directly output on the basis of the sequence 1512 according to the flow of FIG. 15. At this time, a low-delay desiring packet of packet number 3 of the packet train 1601 arrives at the read-out controller 512 during the output of the packet of packet number 6, however, this packet is skipped (sequence 1514). Thereafter, an uninterruptible-switching desiring packet of packet number 4 of the packet train 1601 arrives at the read-out controller 512, the packet of packet number 6 is being output, and thus the packet of packet number 4 is on standby for the processing until the output of the packet of packet number 6 is finished. Accordingly, the packet of packet number 4 of the packet train 1601 is output immediately after the packet of packet number 6 of the packet train 1602 is output (sequence 1506). The packet train 1603 is output by repeating the processing likewise.

According to this embodiment, the low-delay desiring packets can be transmitted while the delay amount thereof is made smaller than the embodiment described with reference to FIGS. 13 and 14. However, with respect to the uninterruptible-switching desiring packet and the marker packet, they may be output with being delayed by up to the time corresponding to the maximum packet length which the packet transfer device 120 can process. Accordingly, with respect to the uninterruptible-switching desiring packet and the marker packet, the time position is not coincident between the 0-system and the 1-system, and thus uninterruptible-switching desiring packets may be missing when the system is switched due to a failure. In order to take countermeasures to this trouble, the output from the SBY system is delayed with respect to the output from the ACT system by the time corresponding to the maximum packet length at a time of output of packets from the read-out controllers 512 and 532, thereby preventing lack of uninterruptible-switching desiring packets.

Figure 17:
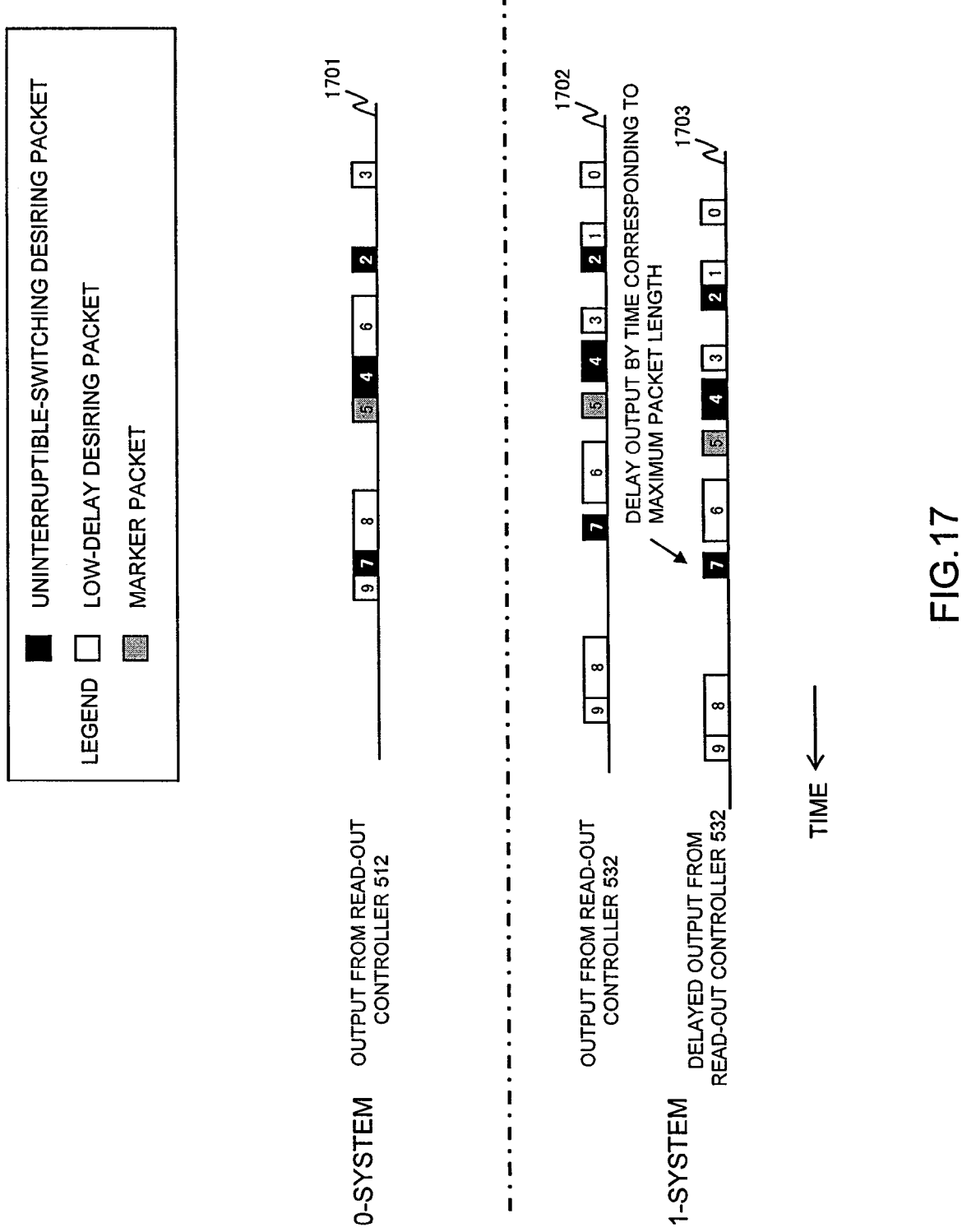
FIG. 17 is a time chart showing an output from the read-out controller when the length of packets is variable.
Figure 18:
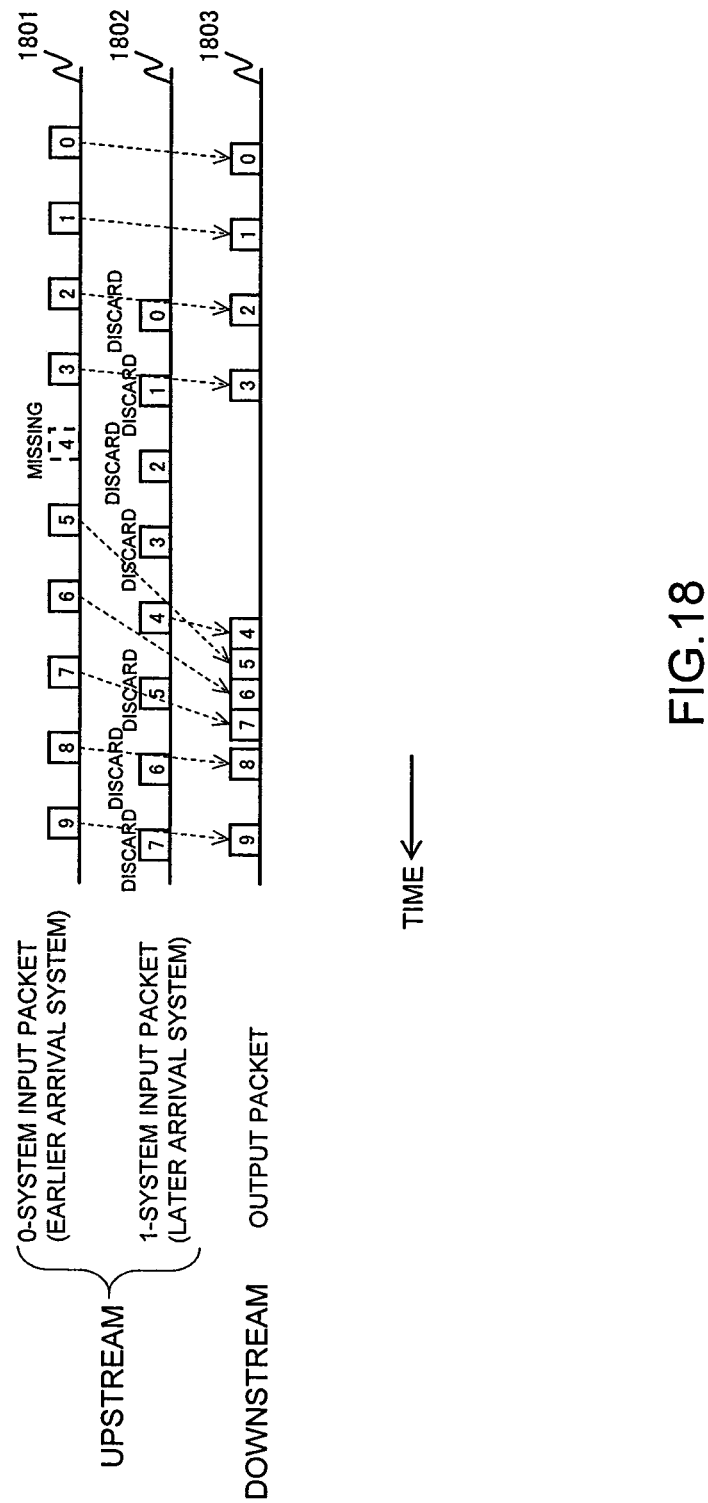
FIG. 18 is a time chart showing the operation of a related art 1.
Figure 19:
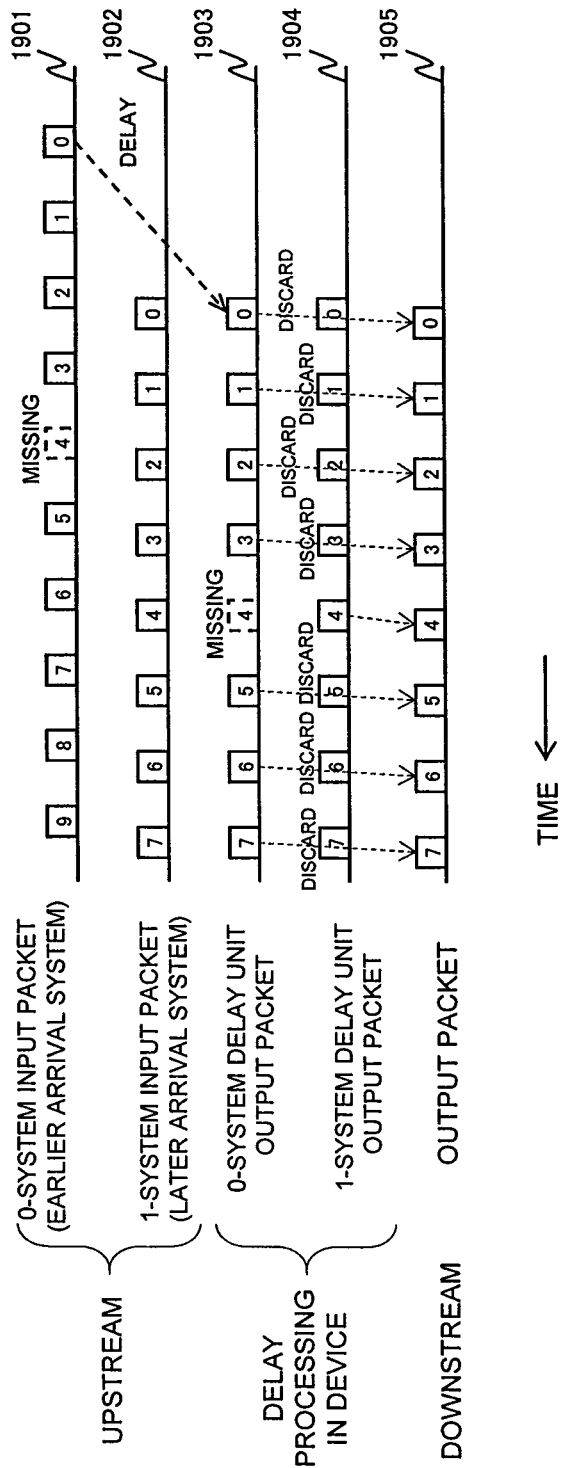
FIG. 19 is a time chart showing the operation of a related art 2.

FIG. 17 shows outputs of packets from the read-out controllers 512 and 532 under a state of 0-system ACT/1-system SBY in which the 0-system serves as an earlier arrival system and the 1-system serves as a later arrival system. A packet train 1701 represents an output from the 0-system read-out controller 512, a packet train 1702 represents an output from the 1-system read-out controller 532, and a packet train 1703 represents an output from the 1-system read-out controller 532 which is delayed by the time corresponding to the maximum packet length. Uninterruptible-switching desiring packets of packet numbers 4 and 7 of the packet train 1702 are transmitted earlier than those of the packet train 1701. Therefore, when system switching occurs due to a failure, the uninterruptible-switching desiring packets of packet numbers 4 and 7 may be missing. On the other hand, the uninterruptible-switching desiring packets of packet numbers 4 and 7 of the packet train 1701 are transmitted earlier than those of the packet train 1703, so that lack of the uninterruptible-switching desiring packets of packet numbers 4 and 7 can be prevented.

As described above, according to the embodiments described above, uninterruptible-switching packets can be processed according to the processing procedure for the uninterruptible-switching desiring packets, and thus uninterruptible switching can be performed. Furthermore, low-delay desiring packets can be transmitted without any fixed delay caused by the uninterruptible-switching function, and thus user packets which desire uninterruptible switching and user packets which desire low delay can be accommodated in one device with being mixed. In addition, an effect of reducing output fluctuation at the system switching time for uninterruptible-switching desiring packets can be achieved.

Furthermore, a network manager can operate two types of packet transfer networks, that is, a packet transfer network for uninterruptible switching and a packet transfer network for low delay by using one packet transfer network, so that the operational cost can be reduced.

What is claimed is:

1. A packet transfer device that transmits input packets by using a redundancy configuration of plural systems, and selects and outputs packets for one transmission path at a reception side in a packet transfer network, comprising:
   an uninterruptible-switching memory and a low-delay memory that store packets;
   a delay unit that delays an input packet by a specified time and outputs a delayed packet to the uninterruptible-switching memory;
   a packet type identifying unit that refers to a tag added to a received packet to identify which one of an uninterruptible-switching desiring packet, a low-delay desiring packet and a marker packet the received packet corresponds to, transmits received uninterruptible-switching desiring packets, low-delay desiring packets and marker packet to the delay unit, transmits only low-delay desiring packets to the low-delay memory, and extracts and outputs a reception time and identification information of a marker packet when the received packet corresponds to the marker packet;
   a controller that measures a packet arrival time difference between a 0-system and a 1-system on the basis of the reception time and the identification information of the marker packet informed from the packet type identifying unit, instructs the packet arrival time difference to the delay unit to make uninterruptible-switching desiring packets of the 0-system and the 1-system be in phase with each other and transmits the uninterruptible-switching desiring packets from the delay unit to the uninterruptible-switching memory; and
   a read-out controller that reads out packets from the uninterruptible-switching memory and/or the low-delay memory and controls packets to be transmitted,
   wherein the read-out controller
   reads out a packet from the uninterruptible-switching memory,
   refers to a tag of the packet read out from the uninterruptible-switching memory to identify which one of an uninterruptible-switching desiring packet, a low-delay desiring packet and a marker packet the read-out packet corresponds to, and
   transmits the read-out packet when the read-out packet is an uninterruptible-switching desiring packet or a marker packet, and
   discards the packet read out from the uninterruptible-switching memory, when the read-out packet is a low-delay desiring packet, and further reads out and outputs a packet when the packet is stored in the low-delay memory,
   wherein
   when the read-out packet is identified as a low-delay desiring packet,
   the read-out controller discards the packer read out from the uninterruptible-switching memory, reads out and transmits a packet when the packet is stored in the low-delay memory, and further skips a low-delay desiring packet that precedes a next uninterruptible-switching packet.

2. The packet transfer device according to claim 1, wherein each of the 0-system and the 1-system comprises:
   the uninterruptible-switching memory, the low-delay memory, the delay unit, the packet type identifying unit and the read-out controller, and further comprises:
   a system selecting unit that, on the basis of an instruction of the controller, selects and transmits a packet transmitted from the read-out controller of the 0-system or the 1-system and deletes a marker packet.

3. The packet transfer device according to claim 1, further comprising: as a transmission function,
   a user type storing unit that stores user type for identifying whether a received packet is an uninterruptible-switching desiring packet or a low-delay desiring packet, in association with user identification information;
   a user type identifying unit that refers to the user type storing unit to identify whether a received user packet is a user packet desiring uninterruptible switching or a user packet desiring low delay;
   a tag adding unit that adds a user packet with a tag for identifying an uninterruptible-switching desiring packet or a low-delay desiring packet on the basis of an identification result of the user type identifying unit;
   a marker inserting unit that generates a marker packet transmitted/received only between packet transfer devices and used for delay amount measurement and uninterruptible switching while adding the marker packet with a tag for identifying the marker packet;
   a multiplexing unit that multiplexes the user packet transmitted from the tag adding unit and the marker packet transmitted from the marker inserting unit;
   a packet copying unit that copies a multiplexed packet achieved by the multiplexing unit into first and second packets; and
   a first and a second packet transmitting units that transmit the first and second packets to first and second packet transfer networks, respectively.

4. A packet transfer device that transmits input packets by using a redundancy configuration of plural systems, and selects and outputs packets for one transmission path at a reception side in a packet transfer network, comprising:
   an uninterruptible-switching memory and a low-delay memory that store packets;
   a delay unit that delays an input packet by a specified time and outputs the delayed packet to the uninterruptible-switching memory;
   a packet type identifying unit that refers to a tag added to a received packet to identify which one of an uninterruptible-switching desiring packet, a low-delay desiring packet and a marker packet the received packet corresponds to, transmits received uninterruptible-switching desiring packets, low-delay desiring packets and marker packet to the delay unit, transmits only low-delay desiring packets to the low-delay memory, and extracts and outputs a reception time and identification information of a marker packet when the received packet corresponds to the marker packet;
   a controller that measures a packet arrival time difference between a 0-system and a 1-system on the basis of the reception time and the identification information of the marker packet informed from the packet type identifying unit, instructs the packet arrival time difference to the delay unit to make uninterruptible-switching desiring packets of the 0-system and the 1-system be in phase with each other and transmits the uninterruptible-switching desiring packets from the delay unit to the uninterruptible-switching memory; and a read-out controller that reads out packets from the uninterruptible-switching memory and/or the low-delay memory and controls packets to be transmitted, wherein the read-out controller reads out a packet from the uninterruptible-switching memory, refers to a tag of the packet read out from the uninterruptible-switching memory to identify which one of an uninterruptible-switching desiring packet, a low-delay desiring packet and a marker packet the read-out packet corresponds to, and transmits the read-out packet when the read-out packet is an uninterruptible-switching desiring packet or a marker packet, discards the packet read out from the uninterruptible-switching memory, when the read-out packet is a low-delay desiring packet, and further reads out and outputs a packet when the packet is stored in the low-delay memory, and wherein the read-out controller obtains an empty time length preceding to incoming of a next uninterruptible-switching desired packet or a marker packet in the uninterruptible-switching memory, compares the obtained empty time length and a packet length of a packet which has been read out from the low-delay memory and held in the read-out controller without being transmitted or a packet length of the packet read out from the low-delay memory when no packet is held in the read-out controller, and transmits the packet when the packet length of the packet is shorter than or equal to the empty time length or holds the packet when the packet length is conversely longer than the empty time length.

5. The packet transfer device according to claim 4, wherein, when the empty time length is obtained, the read-out controller sets as the empty time length a maximum packet length that the packet transfer device can process, in a case where neither uninterruptible-switching desiring packet nor marker packet is stored in the uninterruptible-switching memory.

6. The packet transfer device according to claim 4, wherein each of the 0-system and the 1-system comprises:

the uninterruptible-switching memory, the low-delay memory, the delay unit, the packet type identifying unit and the read-out controller, and further comprises:

a system selecting unit that, on the basis of an instruction of the controller, selects and transmits a packet transmitted from the read-out controller of the 0-system or the 1-system and deletes a marker packet.

7. The packet transfer device according to claim 4, further comprising: as a transmission function, a user type storing unit that stores user type for identifying whether a received packet is an uninterruptible-switching desiring packet or a low-delay desiring packet, in association with user identification information;

a user type identifying unit that refers to the user type storing unit to identify whether a received user packet is a user packet desiring uninterruptible switching or a user packet desiring low delay;

a tag adding unit that adds a user packet with a tag for identifying an uninterruptible-switching desiring packet or a low-delay desiring packet on the basis of an identification result of the user type identifying unit;

a marker inserting unit that generates a marker packet transmitted/received only between packet transfer devices and used for delay amount measurement and uninterruptible switching while adding the marker packet with a tag for identifying the marker packet;

a multiplexing unit that multiplexes the user packet transmitted from the tag adding unit and the marker packet transmitted from the marker inserting unit;

a packet copying unit that copies a multiplexed packet achieved by the multiplexing unit into first and second packets; and a first and a second packet transmitting units that transmit the first and second packets to first and second packet transfer networks, respectively.

8. A packed transfer method in a packet transfer device that transmits input packets by using a redundancy configuration of plural systems, and selects and outputs packets for one transmission path at a reception side in a packet transfer network, comprising steps of:

delaying an input packet by a specified time and outputting a delayed packet to an uninterruptible-switching memory, by a delay unit;

referring to a tag added to a received packet to identify which one of an uninterruptible-switching desiring packet, a low-delay desiring packet and a marker packet the received packet corresponds to, transmitting received uninterruptible-switching desiring packets, low-delay desiring packets and marker packet to the delay unit, transmitting only low-delay desiring packets to a low-delay memory, and extracting and outputting a reception time and identification information of a marker packet when the received packet corresponds to the marker packet;

measuring a packet arrival time difference between a 0-system and a 1-system on the basis of the reception time and the identification information of the marker packet, instructing the packet arrival time difference to the delay unit to make uninterruptible-switching desiring packets of the 0-system and the 1-system be in phase with each other and transmitting the uninterruptible-switching desiring packets from the delay unit to the uninterruptible-switching memory;

reading out a packet from the uninterruptible-switching memory, referring to a tag of the packet read out from the uninterruptible-switching memory to identify which one of an uninterruptible-switching desiring packet, a low-delay desiring packet and a marker packet the read-out packet corresponds to, and transmitting the read-out packet when the read-out packet is an uninterruptible-switching desiring packet or a marker packet, discarding the packet read out from the uninterruptible-switching memory, when the read-out packet is a low-delay desiring packet, and further reading out and outputting a packet when the packet is stored in the low-delay memory, and when the read-out packer is identified as a low-delay desiring packet, discarding the racket read out from the uninterruptible-switching memory, reading out and transmitting a packet when the packet is stored in the low-delay memory, and further skipping a low-delay desiring packet that precedes a next uninterruptible-switching packet.

9. The packet transfer method according to claim 8, wherein, in a packet transfer device at a transmission side, a marker packet for performing system switching is transmitted to a plurality of communication paths, and in a packet transfer device at a reception side, marker packets are received from the plurality of communication paths and a selected system is switched at timings of the marker packets.

10. The packet transfer method according to claim 8, wherein, in a packet transfer device at a transmission side, a marker packet for measuring a path delay time difference of a communication path used for packet transfer is transmitted to a plurality of communication paths, and in a packet transfer device at a reception side, the marker packets are received from the plurality of communication paths, the path delay time difference is measured from an arrival time of each marker packet, and a delay corresponding to a path delay time difference between an earlier arrival system and a latest arrival system is applied to a processing procedure for uninterruptible-switching desiring packets of the earlier arrival system so that the uninterruptible-switching desiring packets of the earlier arrival system are in phase with uninterruptible-switching desiring packets of the latest arrival system.

11. A packet transfer method in a packet transfer device that transmits input packets by using a redundancy configuration of plural systems, and selects and outputs packets for one transmission path at a reception side in a packet transfer network, comprising steps of:

delaying an input packet by a specified time and outputting the delayed packet to an uninterruptible-switching memory, by a delay unit;

referring to a tag added to a received packet to identify which one of an uninterruptible-switching desiring packet, a low-delay desiring packet and a marker packet the received packet corresponds to, transmitting received uninterruptible-switching desiring packets, low-delay desiring packets and marker packet to the delay unit, transmitting only low-delay desiring packets to a low-delay memory, and extracting and outputting a reception time and identification information of a marker packet when the received packet corresponds to the marker packet;

measuring a packet arrival time difference between a 0-system and a 1-system on the basis of the reception time and the identification information of the marker packet, instructing the packet arrival time difference to the delay unit to make uninterruptible-switching desiring packets of the 0-system and the 1-system be in phase with each other and transmitting the uninterruptible-switching desiring packets from the delay unit to the uninterruptible-switching memory;

reading out a packet from the uninterruptible-switching memory, referring to a tag of the packet read out from the uninterruptible-switching memory to identify which one of an uninterruptible-switching desiring packet, a low-delay desiring packet and a marker packet the read-out packet corresponds to, and transmitting the read-out packet when the read-out packet is an uninterruptible-switching desiring packet or a marker packet, discarding the packet read out from the uninterruptible-switching memory, when the read-out packet is a low-delay desiring packet, and further reading out and outputting a packet when the packet is stored in the low-delay memory, and obtaining an empty time length preceding to incoming of a next uninterruptible-switching desired packet or a marker packet in the uninterruptible-switching memory, and comparing the obtained empty time length and a packet length of a packet which has been read out from the low-delay memory and held in the read-out controller without being transmitted or a packet length of the packet read out from the low-delay memory when no packet is held in the read-out controller, and transmitting the packet when the packet length of the packet is shorter than or equal to the empty time length or holds the packet when the packet length is conversely longer than the empty time length.

12. The packet transfer method according to claim 11, wherein, in a packet transfer device at a transmission side, a marker packet for performing system switching is transmitted to a plurality of communication paths, and in a packet transfer device at a reception side, marker packets are received from the plurality of communication paths and a selected system is switched at timings of the marker packets.

13. The packet transfer method according to claim 11, wherein, in a packet transfer device at a transmission side, a marker packet for measuring a path delay time difference of a communication path used for packet transfer is transmitted to a plurality of communication paths, and in a packet transfer device at a reception side, the marker packets are received from the plurality of communication paths, the path delay time difference is measured from an arrival time of each marker packet, and a delay corresponding to a path delay time difference between an earlier arrival system and a latest arrival system is applied to a processing procedure for uninterruptible-switching desiring packets of the earlier arrival system so that the uninterruptible-switching desiring packets of the earlier arrival system are in phase with uninterruptible-switching desiring packets of the latest arrival system.

* * * * *